(12) United States Patent
Shirakata

(10) Patent No.: US 7,751,126 B2
(45) Date of Patent: Jul. 6, 2010

(54) LENS BARREL AND IMAGE PICKUP APPARATUS

(75) Inventor: Satoshi Shirakata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/292,993

(22) Filed: Dec. 2, 2008

(65) Prior Publication Data

US 2009/0185286 A1 Jul. 23, 2009

(30) Foreign Application Priority Data

Jan. 18, 2008 (JP) ............................. 2008-009819

(51) Int. Cl.
*G02B 15/14* (2006.01)
(52) U.S. Cl. .................... 359/701; 359/699; 359/700
(58) Field of Classification Search ......... 359/699–701, 359/694, 696, 704, 823, 824, 811
See application file for complete search history.

(56) References Cited

U.S. PATENT DOCUMENTS

2007/0091475 A1   4/2007   Shirakata
2007/0092246 A1*  4/2007   Aoki et al. .................. 396/462

FOREIGN PATENT DOCUMENTS

JP   2004-109299 A   4/2004
JP   2006-154141 A   6/2006
JP   2007-114528     5/2007
JP   2007-316317 A   12/2007

OTHER PUBLICATIONS

Japanese Office Action issued Nov. 19, 2009 for corresponding Japanese Application No. 2008-009819.

* cited by examiner

*Primary Examiner*—Darryl J Collins
*Assistant Examiner*—Zachary Wilkes
(74) *Attorney, Agent, or Firm*—Rader, Fishman & Grauer PLLC

(57) ABSTRACT

An addendum of a gear portion and a tip end of a first cam follower are located on similar-diameter cylindrical planes centering at a center axis of a cam ring. A gear housing recess is provided in an inner peripheral surface of a fixed ring. A bottom surface of a first-cam-ring-movement cam groove engaging with the first cam follower, and a bottom surface of the recess are located on similar-diameter cylindrical planes centering at a center axis of the fixed ring. A release portion is provided at the inner peripheral surface of the fixed ring to provide communication between a protruding position cam groove portion of the first-cam-ring-movement cam groove and the recess. At the protruding position of the cam ring, a portion of the gear portion near the first cam follower passes through the release portion and is located inside the protruding position cam groove portion.

6 Claims, 29 Drawing Sheets

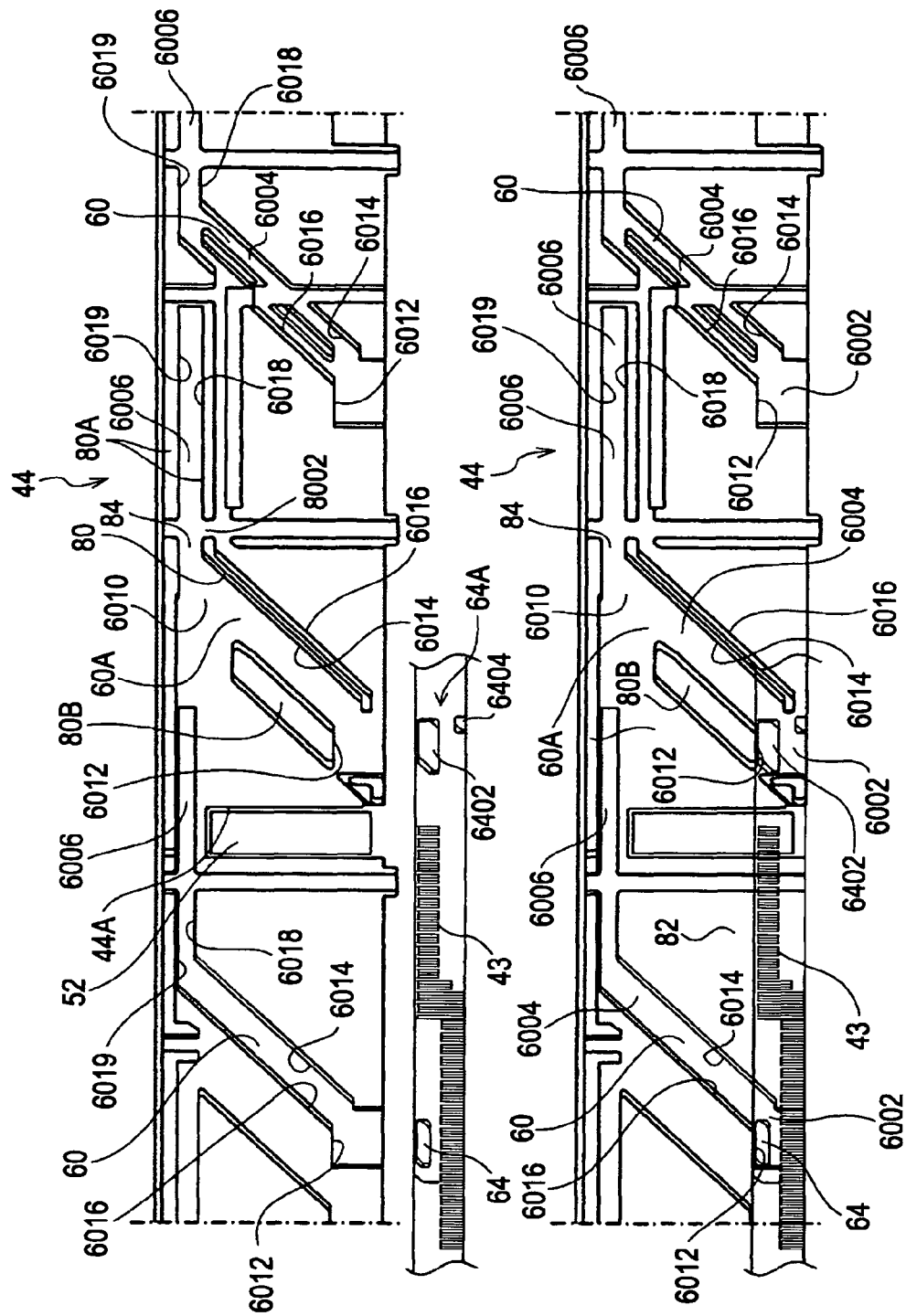

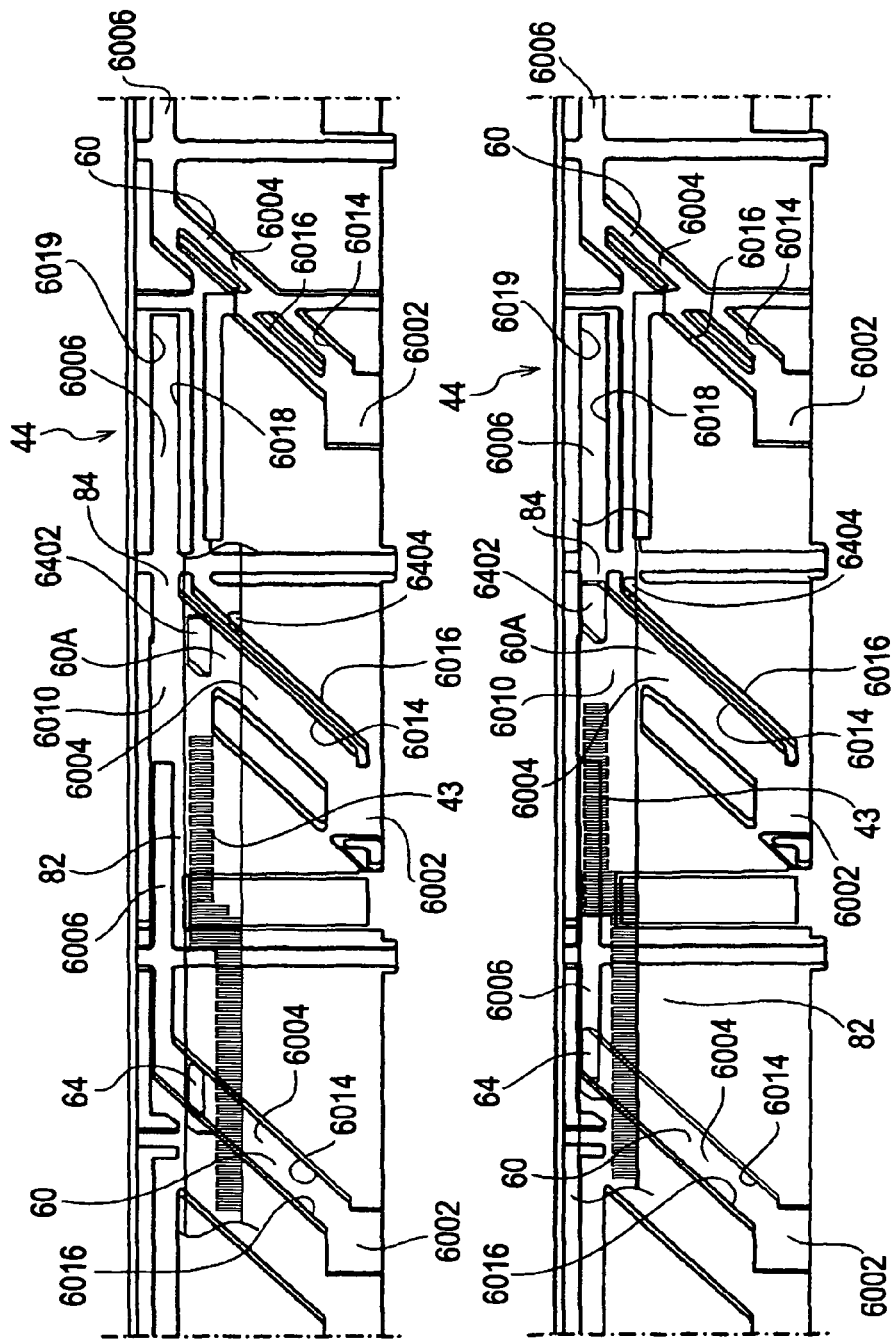

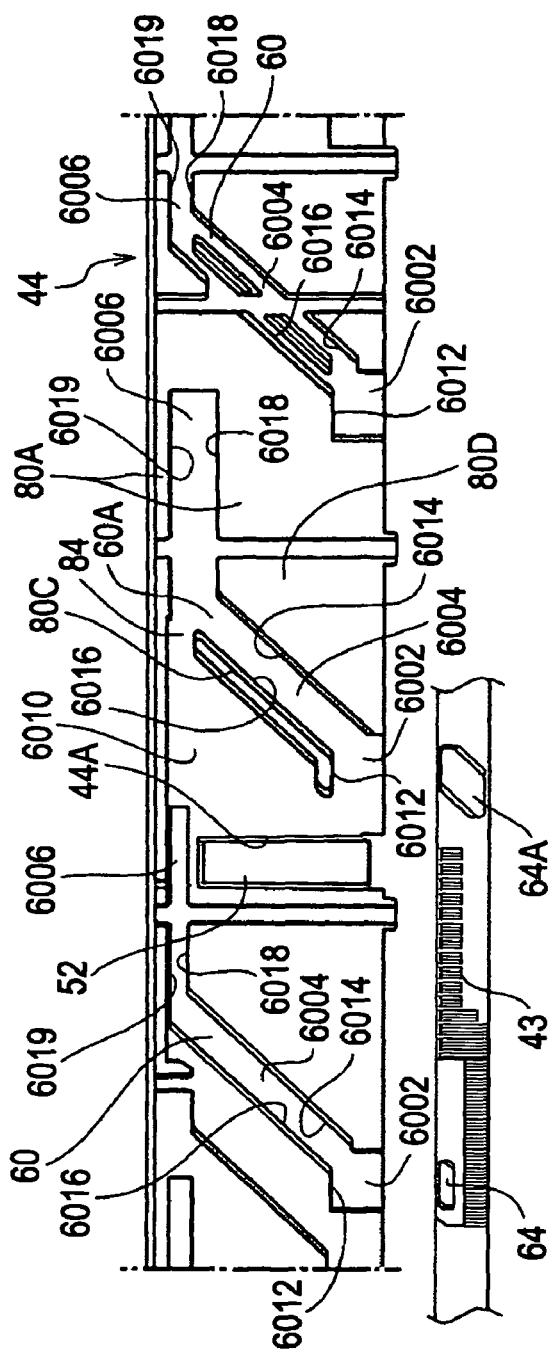
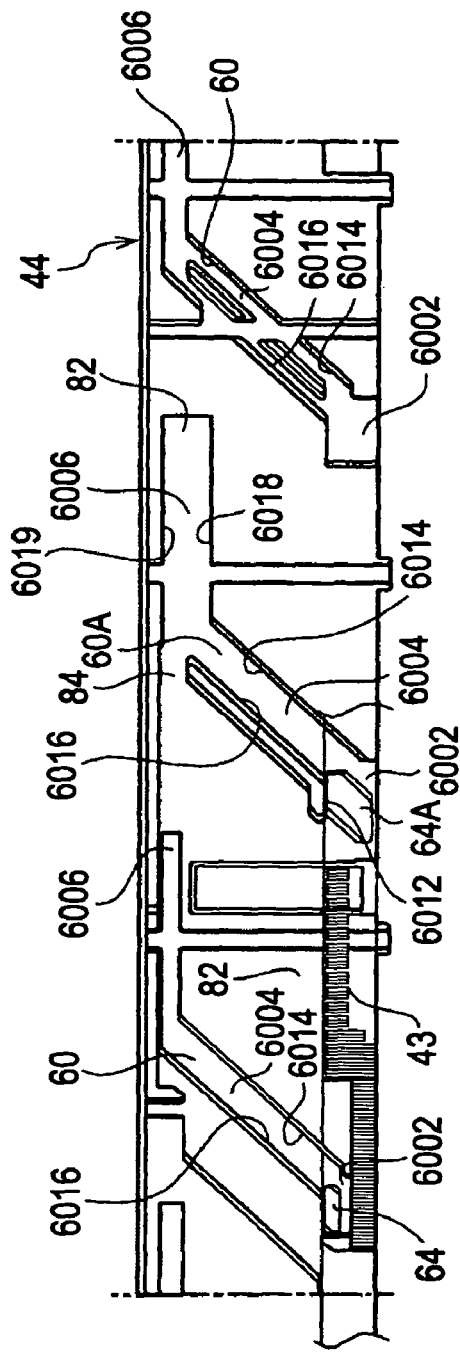
FIG. 26A
FIG. 26B

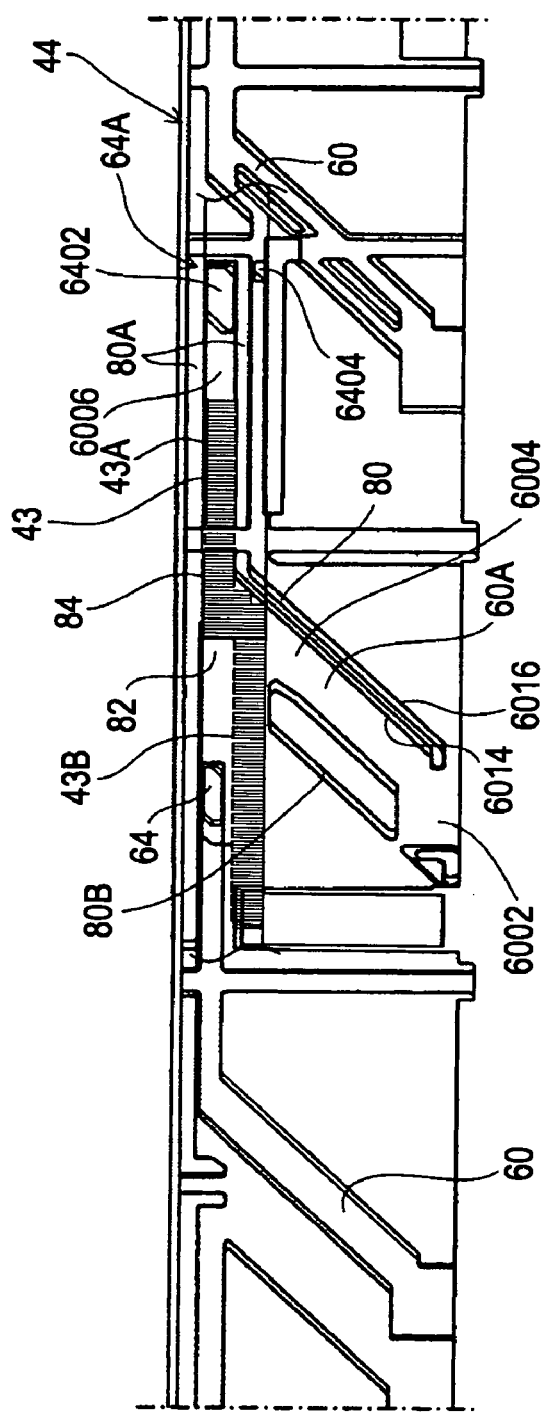
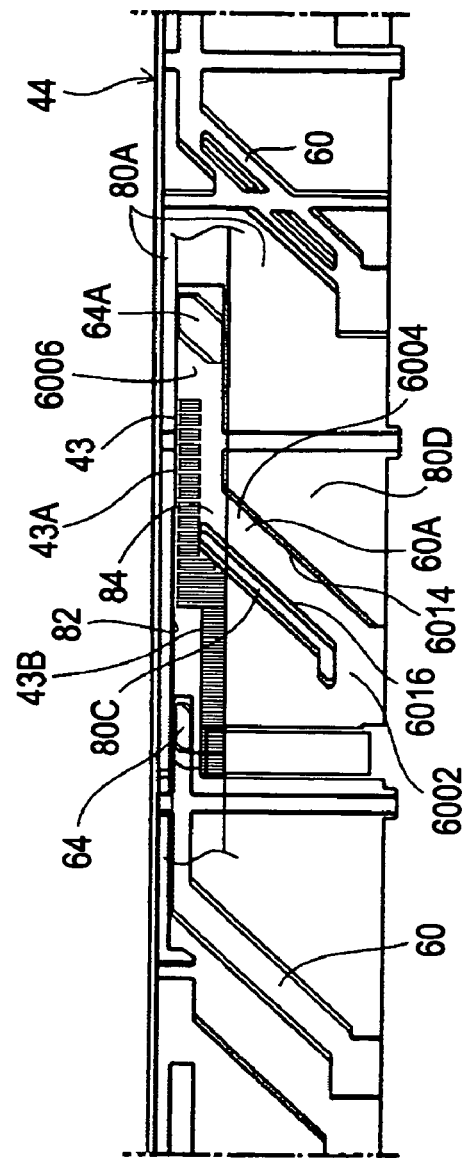
FIG. 29A
FIG. 29B

LENS BARREL AND IMAGE PICKUP APPARATUS

CROSS REFERENCES TO RELATED APPLICATIONS

The present invention contains subject matter related to Japanese Patent Application JP 2008-009819 filed in the Japanese Patent Office on Jan. 18, 2008, the entire contents of which are incorporated herein by reference.

BACKGROUND OF THE INVENTION

1. Field of the Invention

The present invention relates to a lens barrel and an image pickup apparatus.

2. Description of the Related Art

As a type of lens barrels for image pickup apparatuses such as digital still cameras, a collapsible lens barrel is provided, in which a lens frame for supporting a part of a lens defining an imaging optical system moves in an optical-axis direction of the lens such that the lens protrudes and is retracted from a front surface of a case.

A configuration using a cam ring and a fixed ring is suggested as an example configuration for moving such a lens frame in the optical-axis direction (see Japanese Unexamined Patent Application Publication No. 2007-114528).

In this lens barrel, the cam ring has a lens-frame-movement cam groove formed in an inner or outer peripheral surface, a cam follower protruding outward in a radial direction of the outer peripheral surface, and a gear portion protruding outward in the radial direction of the outer peripheral surface and extending in a circumferential direction.

The fixed ring has a cam-ring-movement cam groove and a gear housing recess for housing the gear portion in an inner peripheral surface. The cam follower engages with the cam-ring-movement cam groove.

The cam ring is inserted into the fixed ring, the cam follower of the cam ring engages with the cam-ring-movement cam groove, then, a drive gear meshes with the gear portion, and the cam ring is rotated. Hence, the cam ring moves between a retracted position and a protruding position via the cam follower and the cam-ring-movement cam groove while the cam ring is rotated inside the fixed ring. The gear portion thus moves inside the gear housing recess with the cam ring while the gear portion meshes with the drive gear.

Meanwhile, in recent years, a compact image pickup apparatus is demanded. Thus, a lens barrel advantageous to reducing the size is desired. It is therefore necessary to reduce the size of the fixed ring.

SUMMARY OF THE INVENTION

In particular, the drive gear is arranged at a peripheral wall portion of the fixed ring, the portion corresponding to a moving locus of the gear portion. Also, a rear reduction gear unit including an output gear meshing with the drive gear, a reduction gear which transmits power to the output gear, and a zoom motor which rotationally drives the output gear by transmitting power via the reduction gear, is arranged at the peripheral wall portion. As a result, the peripheral wall portion of the fixed ring markedly protrudes outward in the radial direction, thereby restricting the reduction in size.

In light of the above-described situations, it is desirable to provide a lens barrel and an image pickup apparatus advantageous to reducing the thickness of a peripheral wall portion of a fixed ring, the portion corresponding to a moving locus of a gear portion.

According to an embodiment of the present invention, a lens barrel includes a cam ring having a lens-frame-movement cam groove formed in an inner or outer peripheral surface, a plurality of cam followers provided at the outer peripheral surface at positions at intervals in a circumferential direction of the outer peripheral surface and protruding outward in a radial direction of the outer peripheral surface, and a gear portion extending in the circumferential direction while protruding outward in the radial direction of the outer peripheral surface; and a fixed ring having a plurality of cam-ring-movement cam grooves in an inner peripheral surface, the cam followers respectively engaging with the cam-ring-movement cam grooves, the cam ring being inserted into the fixed ring. The cam-ring-movement cam grooves include a retracted position cam groove portion, a movement cam groove portion, and a protruding position cam groove portion, the retracted position cam groove portion causing the cam ring to be located at a retracted position retracted into the fixed ring in a first rotation range of the cam ring by rotation of a drive gear meshing with the gear portion, the movement cam groove portion being connected to the retracted position cam groove portion and causing the cam ring to move in an axial direction of the fixed ring inside the fixed ring in a second rotation range of the cam ring in association with rotation of the cam ring, the protruding position cam groove portion being connected to the movement cam groove portion and causing the cam ring to be located at a protruding position protruding from the fixed ring in a third rotation range of the cam ring. A gear housing recess is formed in the inner peripheral surface of the fixed ring, the gear housing recess housing the gear portion which moves to follow the movement of the cam ring. The gear portion is arranged at a position shifted from that of a first cam follower, which is one of the cam followers, in the circumferential direction of the fixed ring so as to be located at the rear side in a moving direction of the first cam follower when the cam follower moves from the retracted position cam groove portion to the protruding position cam groove portion. The cam ring moves between the retracted position and the protruding position via the cam followers and the cam-ring-movement cam grooves while the cam ring is rotated inside the fixed ring by rotating the cam ring via the gear portion. An addendum of the gear portion and a tip end of the first cam follower are located on cylindrical planes centering at a center axis of the cam ring and having substantially equivalent diameters. A bottom surface of a first-cam-ring-movement cam groove, which is included in the cam-ring-movement cam grooves and with which the first cam follower engages, and a bottom surface of the gear housing recess are located on cylindrical planes centering at a center axis of the fixed ring and having substantially equivalent diameters. A release portion is provided at the inner peripheral surface of the fixed ring, to provide communication between the protruding position cam groove portion of the first-cam-ring-movement cam groove and the gear housing recess. In the protruding position, a portion of the gear portion located near the first cam follower passes through the release portion and is located in the protruding position cam groove portion of the first-cam-ring-movement cam groove.

According to another embodiment of the present invention, an image pickup apparatus includes a lens barrel including a cam ring having a lens-frame-movement cam groove formed in an inner or outer peripheral surface, a plurality of cam followers provided at the outer peripheral surface at positions at intervals in a circumferential direction of the outer peripheral surface and protruding outward in a radial direction of the outer peripheral surface, and a gear portion extending in the circumferential direction while protruding outward in the radial direction of the outer peripheral surface; and a fixed ring having a plurality of cam-ring-movement cam grooves in an inner peripheral surface, the cam followers respectively engaging with the cam-ring-movement cam grooves, the cam ring being inserted into the fixed ring. The cam-ring-movement cam grooves include a retracted position cam groove portion, a movement cam groove portion, and a protruding position cam groove portion, the retracted position cam groove portion causing the cam ring to be located at a retracted position retracted into the fixed ring in a first rotation range of the cam ring by rotation of a drive gear meshing with the gear portion, the movement cam groove portion being connected to the retracted position cam groove portion and causing the cam ring to move in an axial direction of the fixed ring inside the fixed ring in a second rotation range of the cam ring in association with rotation of the cam ring, the protruding position cam groove portion being connected to the movement cam groove portion and causing the cam ring to be located at a protruding position protruding from the fixed ring in a third rotation range of the cam ring. A gear housing recess is formed in the inner peripheral surface of the fixed ring, the gear housing recess housing the gear portion which moves to follow the movement of the cam ring. The gear portion is arranged at a position shifted from that of a first cam follower, which is one of the cam followers, in the circumferential direction of the fixed ring so as to be located at the rear side in a moving direction of the first cam follower when the cam follower moves from the retracted position cam groove portion to the protruding position cam groove portion. The cam ring moves between the retracted position and the protruding position via the cam followers and the cam-ring-movement cam grooves while the cam ring is rotated inside the fixed ring by rotating the cam ring via the gear portion. An addendum of the gear portion and a tip end of the first cam follower are located on cylindrical planes centering at a center axis of the cam ring and having substantially equivalent diameters. A bottom surface of a first-cam-ring-movement cam groove, which is included in the cam-ring-movement cam grooves and with which the first cam follower engages, and a bottom surface of the gear housing recess are located on cylindrical planes centering at a center axis of the fixed ring and having substantially equivalent diameters. A release portion is provided at the inner peripheral surface of the fixed ring, to provide communication between the protruding position cam groove portion of the first-cam-ring-movement cam groove and the gear housing recess. In the protruding position, a portion of the gear portion located near the first cam follower passes through the release portion and is located in the protruding position cam groove portion of the first-cam-ring-movement cam groove.

With the embodiments of the present invention, since the gear portion moves between the gear housing recess of the fixed ring and the protruding position cam groove portion of the first-cam-ring-movement cam groove, the cam ring can smoothly move while the gear portion is prevented from interfering with the inner peripheral surface of the fixed ring.

Accordingly, the peripheral wall portion of the fixed ring, the portion corresponding to the moving locus of the gear portion, can be reduced.

BRIEF DESCRIPTION OF THE DRAWINGS

FIG. 23A is an explanatory diagram showing a gear portion and a cam follower of the cam ring, and a cam-ring-movement cam groove of the fixed ring, and FIG. 23B is an explanatory diagram showing operations of the cam ring and the fixed ring;

FIGS. 24C and 24D are explanatory diagrams each showing the operations of the cam ring and the fixed ring;

FIG. 26A is an explanatory diagram showing a gear portion and a cam follower of a cam ring, and a cam-ring-movement cam groove of a fixed ring, and FIG. 26B is an explanatory diagram showing operations of the cam ring and the fixed ring, according to a second embodiment;

FIG. 29A is an explanatory diagram showing a condition in which the cam ring is located at the protruding position according to the first embodiment, and FIG. 29B is an explanatory diagram showing a condition in which the cam ring is located at a protruding position according to the second embodiment.

DESCRIPTION OF THE PREFERRED EMBODIMENTS

Embodiments of the present invention are described below with reference to the attached drawings.

First Embodiment

In this embodiment, a case is described in which a lens barrel according to an embodiment of the present invention is installed in an image pickup apparatus.

Figure 1:
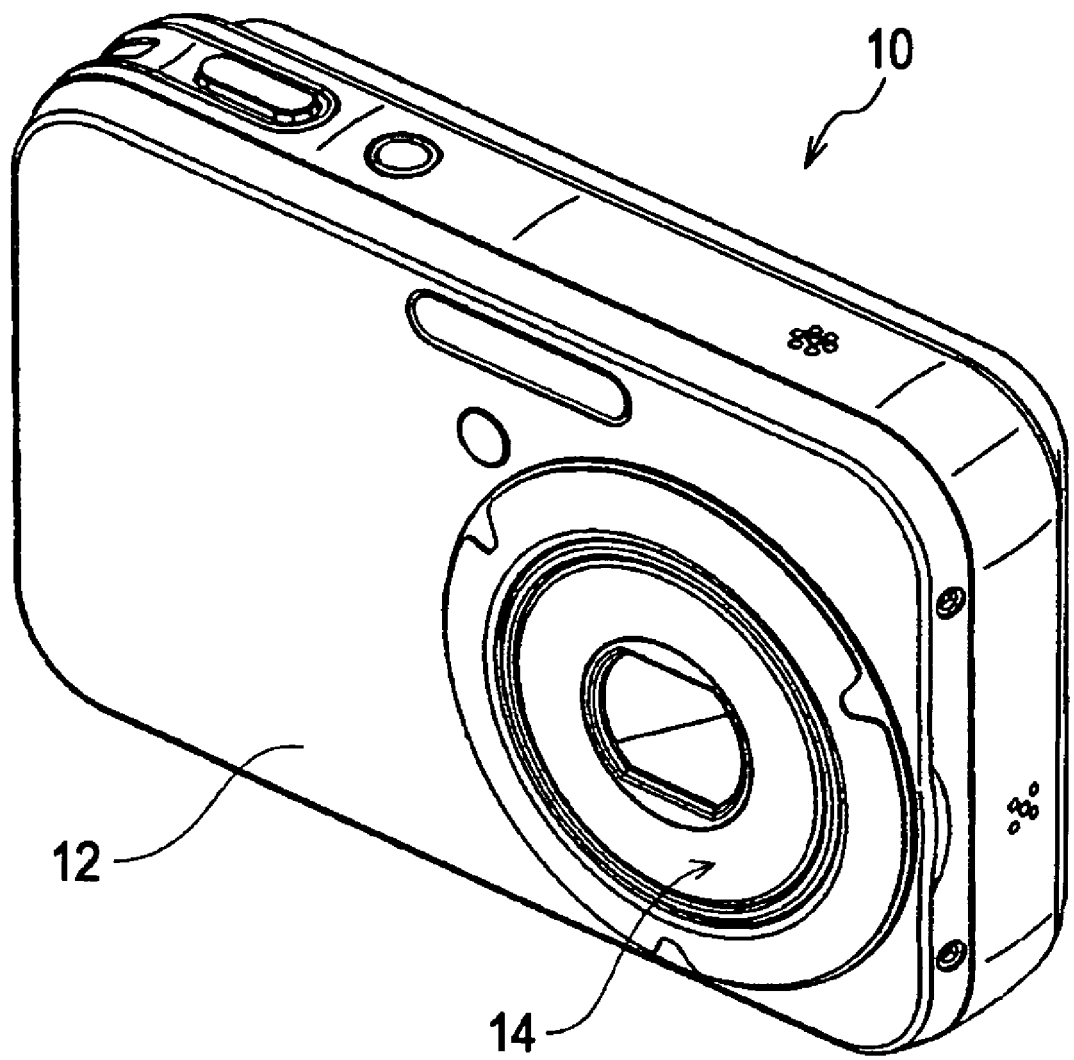
FIG. 1 is a perspective view showing a condition in which a lens barrel of an image pickup apparatus is located at a collapsed position.
Figure 2:
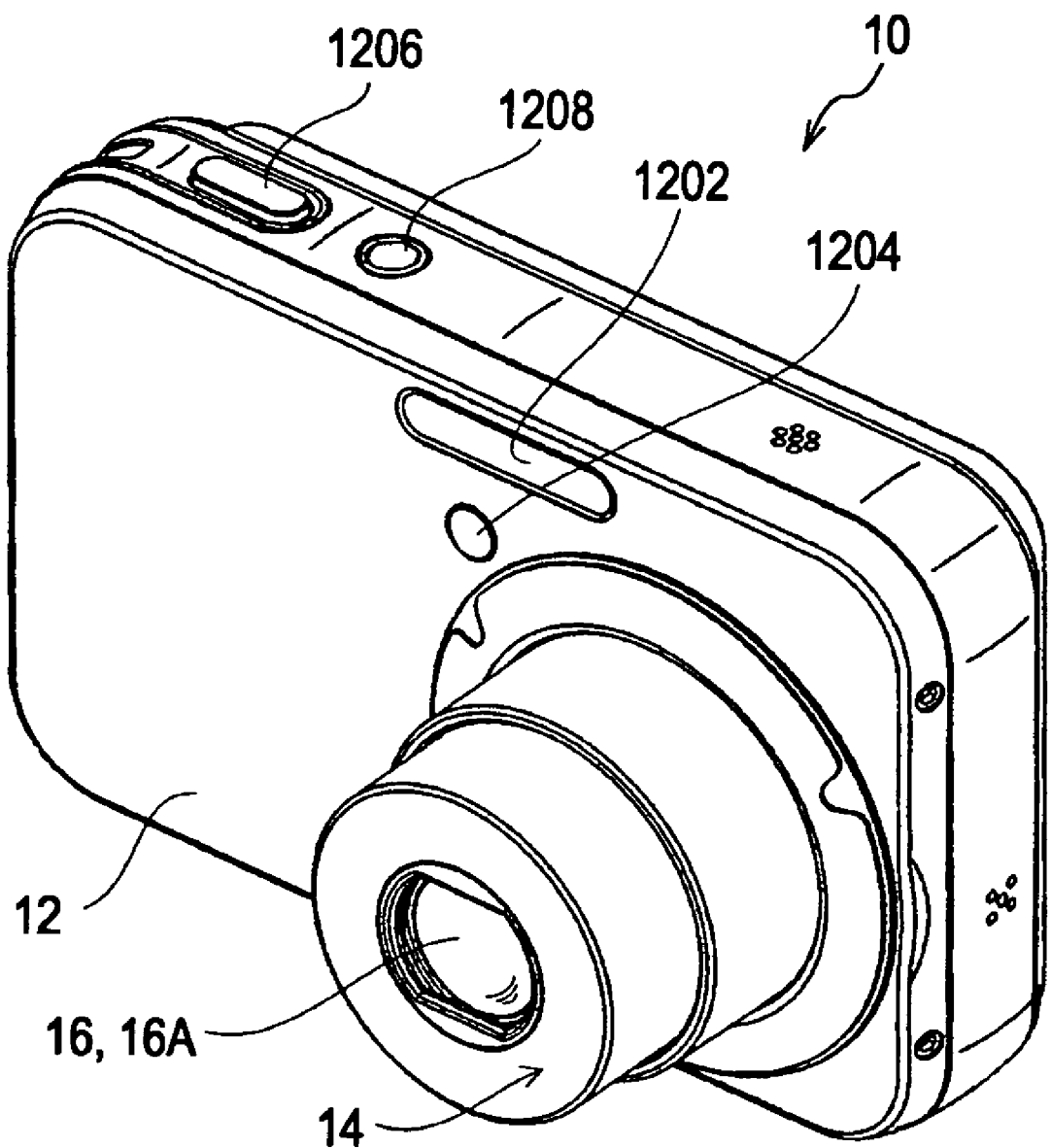
FIG. 2 is a perspective view showing a condition in which the lens barrel of the image pickup apparatus is located at a use position.
Figure 3:
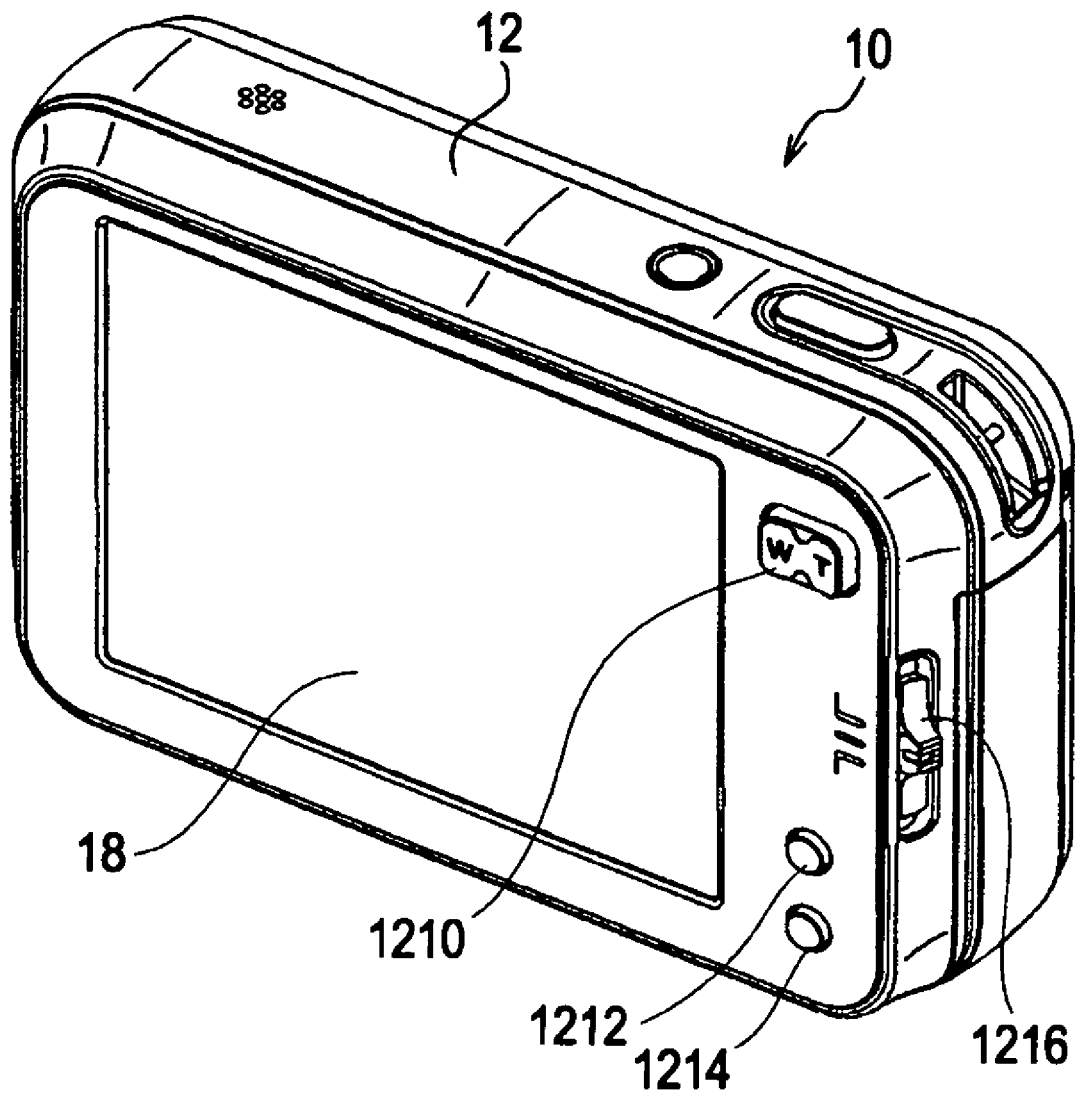
FIG. 3 is a perspective view showing a rear surface of the image pickup apparatus.
Figure 4:
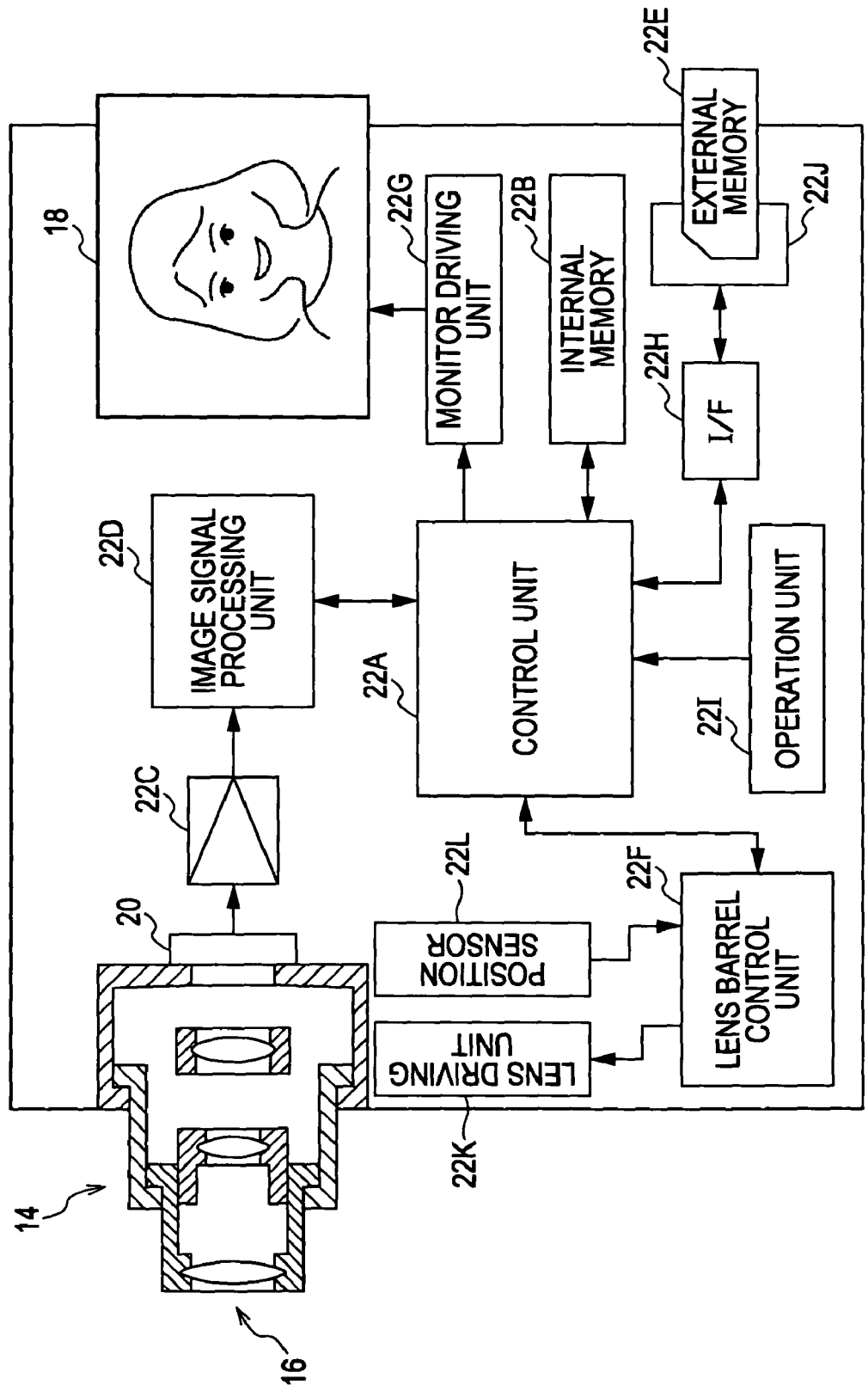
FIG. 4 is a block diagram showing a control system of the image pickup apparatus.

FIG. 1 is a perspective view showing a condition in which a lens barrel 14 of an image pickup apparatus 10 is located at a collapsed position. FIG. 2 is a perspective view showing a condition in which the lens barrel 14 of the image pickup apparatus 10 is located at a use position. FIG. 3 is a perspective view showing a rear surface of the image pickup apparatus 10. FIG. 4 is a block diagram showing a control system of the image pickup apparatus 10.

Throughout the specification, it is expected that the left and right sides are determined when the image pickup apparatus is viewed from the front side. The side of an object is called front side, and the side of an image pickup element is called rear side.

(Image Pickup Apparatus 10)

Referring to FIGS. 1 and 2, the image pickup apparatus 10 is a digital still camera, and has a case 12 which defines an exterior.

The lens barrel 14 according to this embodiment is installed in a right portion of the case 12.

The lens barrel 14 includes an imaging optical system 16 which guides an object image to an image pickup element 20 (see FIG. 4). An object image is formed through the imaging optical system 16. The image pickup element 20 captures the formed object image and generates an image pickup signal. The image pickup element 20 is formed of a charge-coupled device (CCD) sensor or a complementary mental-oxide semiconductor (CMOS) sensor.

The imaging optical system 16 includes a plurality of lenses. An objective lens 16A is one of the lenses located at the most object side.

The lens barrel 14 moves between a housed position at which the objective lens 16A is retracted into a front surface of the case 12 as shown in FIG. 1 and a protruding position at which the objective lens 16A protrudes as shown in FIG. 1.

Referring to FIG. 2, for example, a flash 1202 which emits a photographic auxiliary light, and a light-emitting portion 1204 which emits an auto-focus auxiliary light are provided at an upper center portion of the front surface of the case 12.

A shutter button 1206 for shooting an image, and a power button 1208 are provided at a top surface of the case 12.

Referring to FIG. 3, a mode selection switch 1216 which selects a function mode (e.g., still image, movie, reproduction) is provided at a left surface of the case 12.

A display panel 18, on which a captured still image or movie, or a menu screen is displayed, is provided at a substantially center portion of the rear surface of the case 12. The display panel 18 may be an existing display panel, such as a liquid crystal display panel or an organic electroluminescence (EL) display panel.

Herein, a touch panel having a touch operation function, which is capable of an operation through operator's contact on a display surface, may be optionally provided on the display surface of the display panel 18.

An optical zoom operation button 1210 which performs a zooming operation, a menu button 1212 which selects a menu, and a display change button 1214 which changes a screen display, and the like, are provided at a left portion of the rear surface of the case 12.

(Control System)

Referring to FIG. 4, the image pickup apparatus 10 includes, in addition to the image pickup element 20 and the display panel 18, a control unit 22A, an internal memory 22B having a program memory, a data memory, a RAM, a ROM, and so on, for driving the control unit 22A, an amplifier 22C which amplifies an image pickup signal supplied from the image pickup element 20, an image signal processing unit 22D which processes the image pickup signal supplied from the amplifier 22C into a predetermined signal, an external memory 22E, such as a memory card, for increasing a storage capacity, a lens barrel control unit 22F which controls driving of the lens barrel 14, a monitor driving unit 22G which drives the display panel 18, an interface (I/F) 22H, and an operation unit 22I.

The control unit 22A includes, for example, an arithmetic circuitry having a microcomputer (CPU). The control unit 22A controls the internal memory 22B, the amplifier 22C, the image signal processing unit 22D, the lens barrel control unit 22F, the monitor driving unit 22G, the interface (I/F) 22H, and the operation unit 22I.

The external memory 22E can be connected to the interface 22H via a connector 22J, in an attachable and detachable manner.

The operation unit 22I includes the shutter button 1206, the power button 1208, the optical zoom operation button 1210, the menu button 1212 for selecting a menu, the display change button 1214 for changing a screen display, and so on. The operation unit 22I inputs an operation signal to the control unit 22A.

The lens barrel control unit 22F is connected to a lens driving unit 22K which controls driving of the lens barrel 14, and a position sensor 22L which detects a rotating amount and a moving amount in an optical-axis direction of the lens barrel 14.

The control unit 22A controls the respective portions in accordance with an operation signal supplied from the operation unit 22I.

In particular, when the shutter button 1206 is operated, the image pickup element 20 captures an image which is guided by the imaging optical system 16 to an image pickup surface of the image pickup element 20. The image pickup element 20 generates an image pickup signal. The image pickup signal is supplied to the image signal processing unit 22D via the amplifier 22C.

The signal processed into a predetermined image signal by the image signal processing unit 22D is supplied to the control unit 22A.

Accordingly, the signal corresponding to the image of the object is supplied from the control unit 22A to the monitor driving unit 22G, the internal memory 22B, or the external memory 22E.

Accordingly, an image corresponding to the image of the object is displayed on the display panel 18 via the monitor driving unit 22G. Image data is stored in the internal memory 22B or the external memory 22E.

Also, when the optical zoom operation button 1210 is operated, the control unit 22A controls the lens driving unit 22K via the lens barrel control unit 22F. In particular, the lens barrel control unit 22F controls the lens driving unit 22K on the basis of a detection signal from the position sensor 22L so as to perform a zoom operation to a wide-angle side or a telephoto side, thereby controlling the rotating amount and the moving amount in the optical-axis direction of the lens barrel 14.

(Lens Barrel 14)

Next, the structure of the lens barrel 14 is described.

Figure 5:
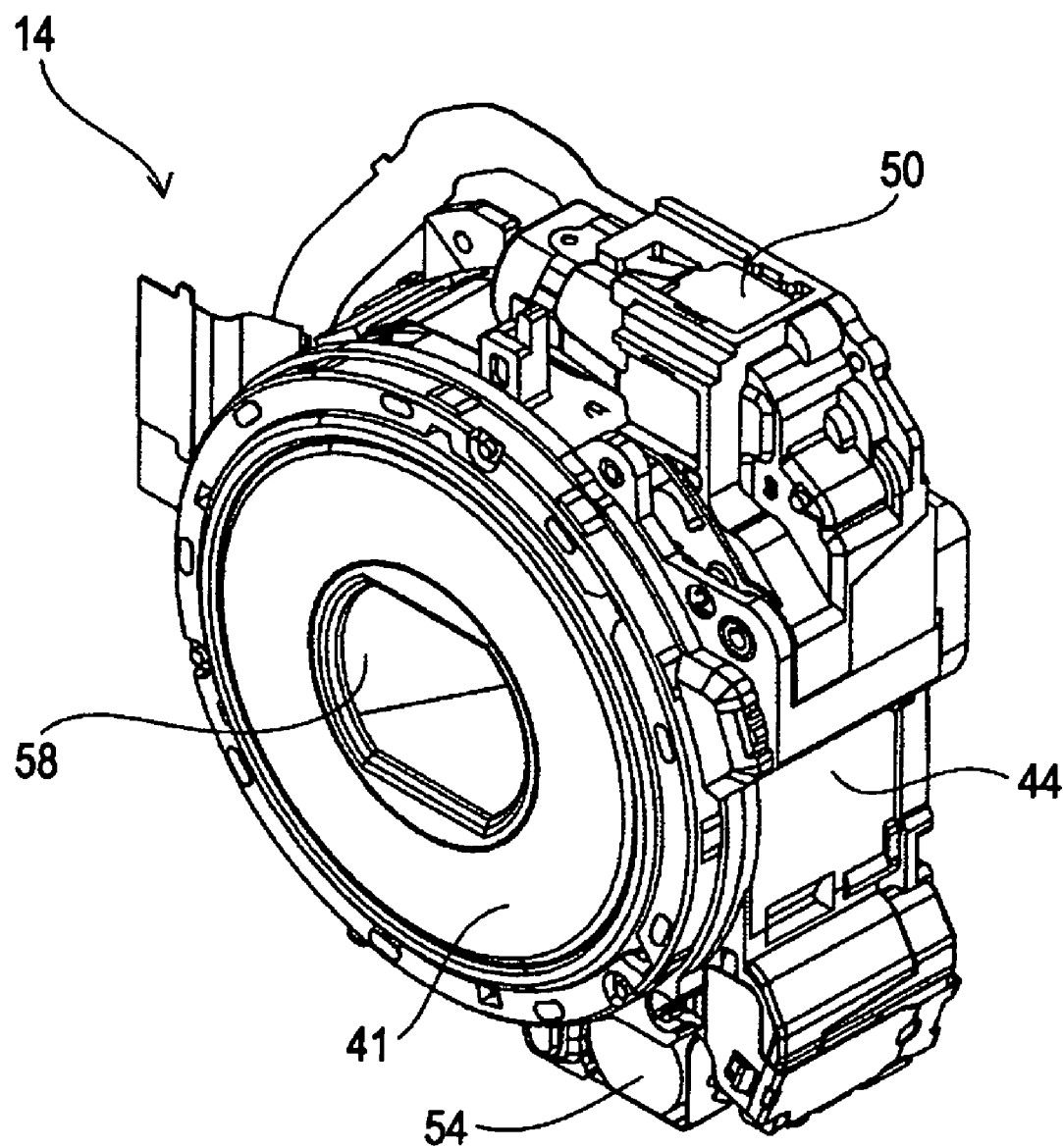
FIG. 5 is a perspective view showing a condition in which the lens barrel according to a first embodiment is located at a housed position.
Figure 6:
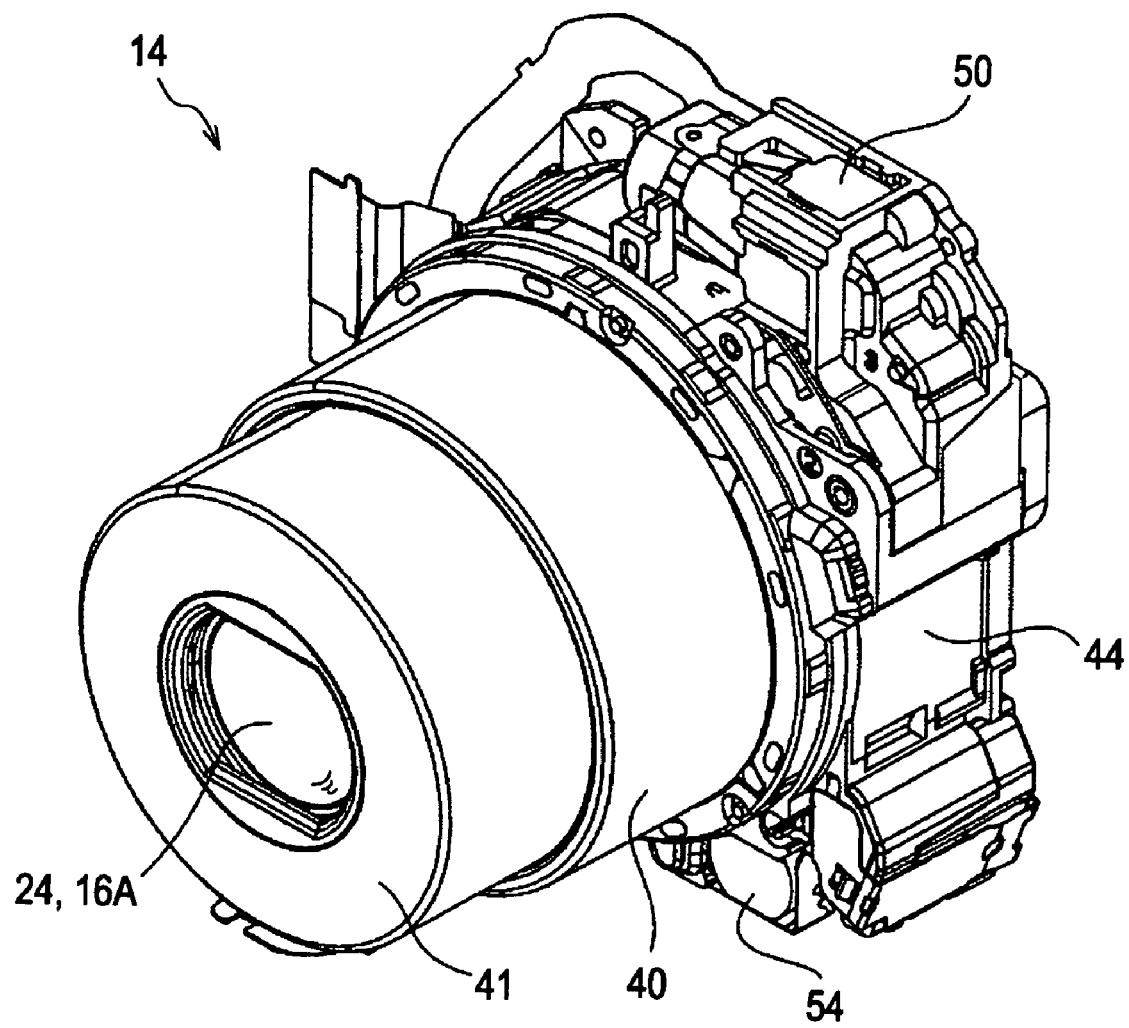
FIG. 6 is a perspective view showing a condition in which the lens barrel according to the embodiment is located at a protruding position.
Figure 7:
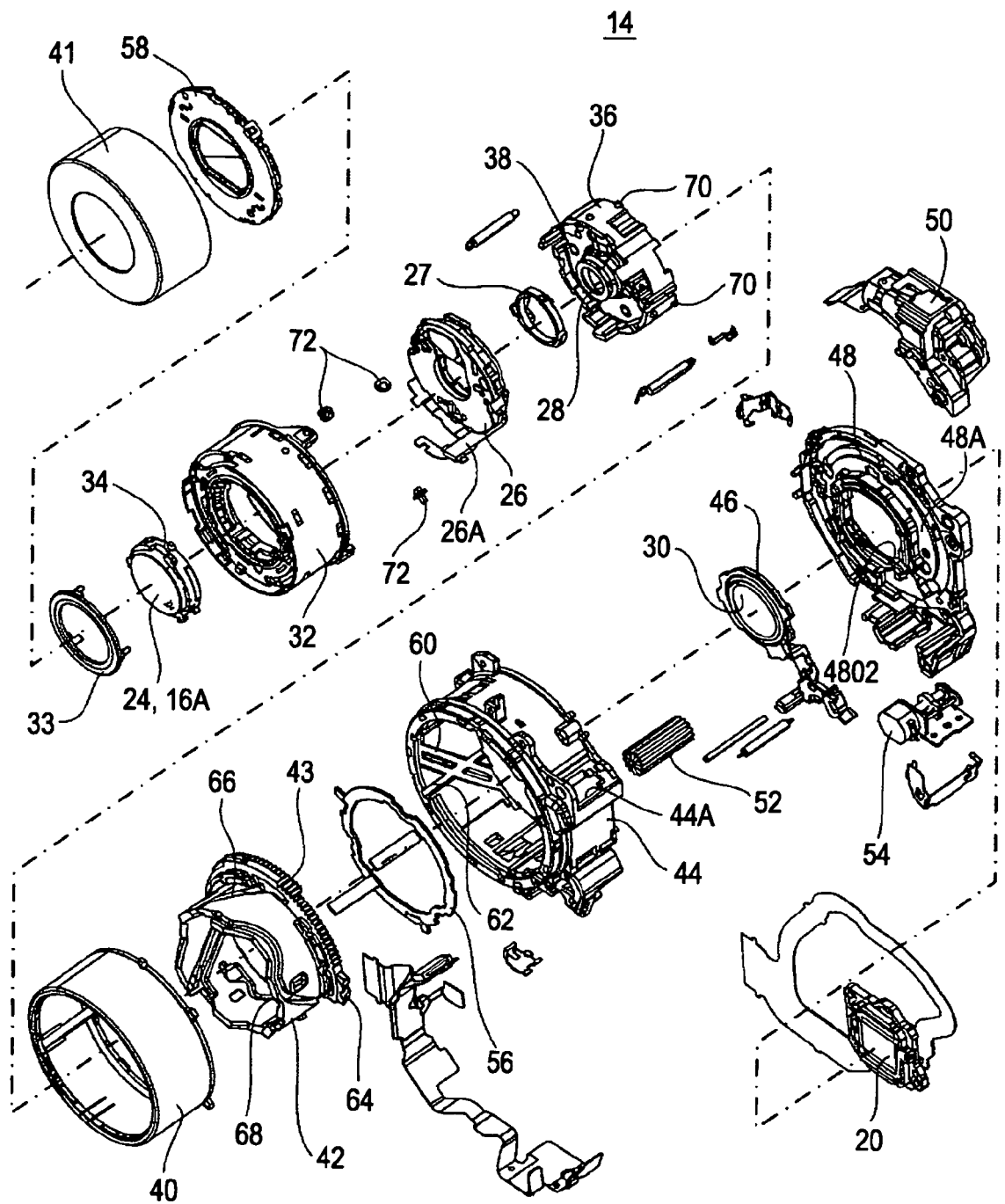
FIG. 7 is an exploded perspective view showing the lens barrel.

FIG. 5 is a perspective view showing a condition in which the lens barrel 14 according to this embodiment is located at the housed position. FIG. 6 is a perspective view showing a condition in which the lens barrel 14 according to this embodiment is located at the protruding position. FIG. 7 is an exploded perspective view showing the lens barrel 14.

Referring to FIG. 7, the imaging optical system 16 of the lens barrel 14 includes a first lens group 24 (objective lens 16A), an automatic exposure device 26, a second lens group 28, and a third lens group 30, in that order from the object side. The first lens group 24 has a plurality of lenses. The automatic exposure device 26 has a shutter and an iris unit. The second lens group 28 has a plurality of lenses. The third lens group 30 has at least one lens.

The first lens group 24 and the second lens group 28 provide a zooming function. A zooming operation of the imaging optical system 16 is performed by moving both lens groups 24 and 28 in the optical-axis direction by a predetermined distance. Also, the third lens group 30 provides a focusing function. A focusing operation of the imaging optical system 16 is performed by moving the third lens group 30 in the optical-axis direction by a predetermined distance.

A mechanic system of the lens barrel 14 includes, in the order from the object side, a first group moving frame 32, a first group lens frame 34 which holds the first lens group 24, a second group lens frame 38 which holds the second lens group 28, a second group moving frame 36 which holds the second group lens frame 38, a linear-movement ring 40, a cam ring 42, a fixed ring 44 which is fixed to the case 12, a third group lens frame 46 which holds the third lens group 30, and a rear barrel 48 which is fixed to a rear portion of the fixed ring 44. The image pickup element 20 is attached to the rear barrel 48.

Also, a power system of the lens barrel 14 includes a rear reduction gear unit 50 and a drive gear 52 which rotationally operate the cam ring 42, and a motor unit 54 which performs the focusing operation of an optical system.

The rear reduction gear unit 50 and the motor unit 54 are attached to an assembly of the fixed ring 44 and the rear barrel 48 as shown in FIG. 5. The drive gear 52 is rotatably supported by the fixed ring 44 and the rear barrel 48.

The rear barrel 48 has a ring-like rear surface portion 48A with a substantially rectangular through hole 4802 at a center portion. The motor unit 54 is supported by the rear surface portion 48A.

The image pickup element 20 is attached to a rear surface of the rear barrel 48 such that the image pickup surface of the image pickup element 20 is exposed through the through hole 4802.

The fixed ring 44 is fixed to a front portion of the rear barrel 48.

The fixed ring 44 is formed of a cylindrical body, which has a substantially cylindrical shape and defines an exterior member of the lens barrel 14. The whole imaging optical system 16 can be housed in the fixed ring 44.

The fixed ring 44 has a cut portion 44A through which a part of the drive gear 52 is exposed, and a cut portion through which a part of the third group lens frame 46 is exposed.

Figure 16:
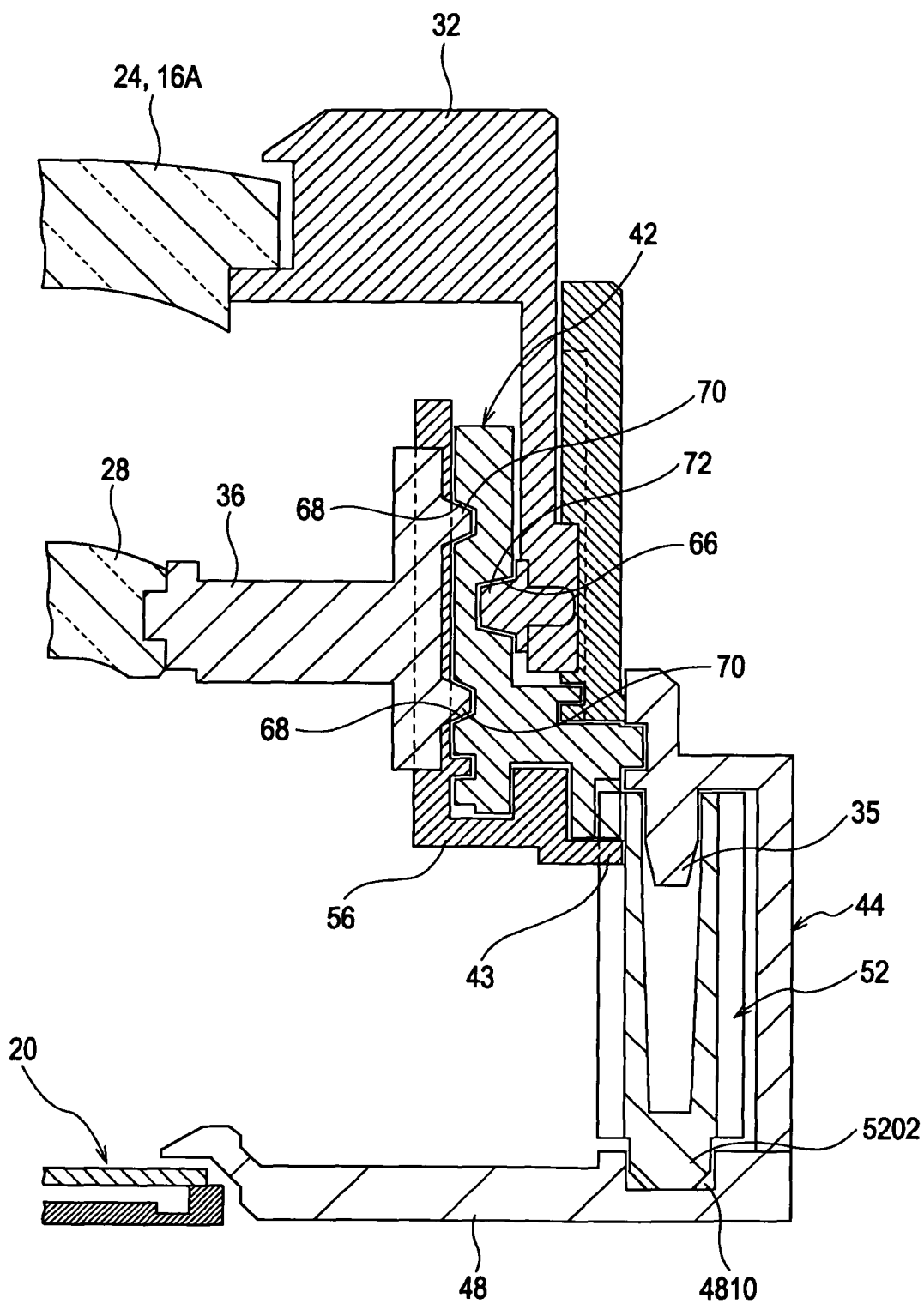
FIG. 16 is a cross-sectional view showing the lens barrel.

Referring to FIG. 16, a support shaft 35 protrudes from a portion of the fixed ring 44, the portion being exposed to the cut portion 44A. The support shaft 35 rotatably supports one end of the drive gear 52 in an axial direction. Also, a bearing portion 4810 is provided at a portion of the rear barrel 48, the portion being exposed to the cut portion 44A. The bearing portion 4810 rotatably supports a shaft portion 5202 protruding from another end of the drive gear 52 in the axial direction.

Thus, the support shaft 35 is held by the lens barrel assembly of the fixed ring 44 and the rear barrel 48. A substantially whole length in a tooth width direction of teeth of the drive gear 52 rotatably supported by the support shaft 35 is exposed to the outside of the lens barrel assembly through the cut portion 44A. The rear reduction gear unit 50 is attached to a peripheral wall of the fixed ring 44 so as to cover an exposed portion of the drive gear 52.

The rear reduction gear unit 50 includes, though not illustrated, an output gear meshing with the drive gear 52, at least one reduction gear which transmits power to the output gear, and a zoom motor which rotationally drives the output gear by transmitting power via the reduction gear. The rear reduction gear unit 50 also has a rotation detector, such as a rotary encoder, which detects the number of rotations of the zoom motor and outputs a detection signal.

The motor unit 54 serves as a power source for performing the focusing operation of the lens barrel 14. The motor unit 54 includes a focus motor, and a carriage which is movably screwed with a rotation shaft of the focus motor and guided in the optical-axis direction.

The third group lens frame 46 engages with the carriage of the motor unit 54. Hence, the predetermined focusing operation is performed by moving the third lens group 30 by a predetermined distance in the optical-axis direction, in accordance with a rotating amount of the motor unit 54.

A plurality of cam-ring-movement cam grooves 60 and a plurality of linear-movement guide grooves 62 are formed in an inner periphery of the fixed ring 44 so as to extend in the optical-axis direction.

The cam ring 42 is arranged inside the fixed ring 44.

The cam ring 42 has cam followers 64 which engage with the cam-ring-movement cam grooves 60 of the fixed ring 44.

The drive gear 52 meshes with a gear portion 43 which is provided at a flange portion of the cam ring 42. Accordingly, when the drive gear 52 is rotationally driven by the operation of the rear reduction gear unit 50, the cam ring 42 is rotated counterclockwise or clockwise depending on the rotation direction. The cam followers 64 of the cam ring 42 move along the cam-ring-movement cam grooves 60 of the fixed ring 44, and hence the cam ring 42 is moved in the optical-axis direction.

Figure 17:
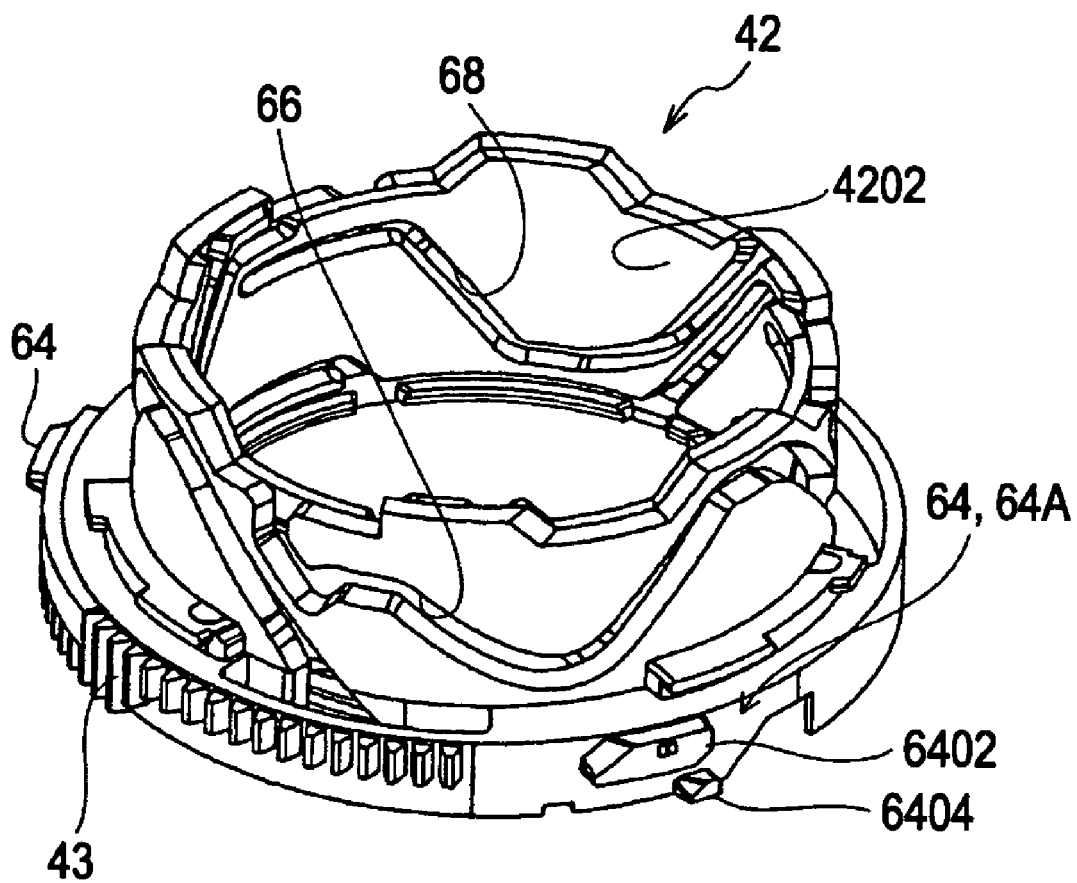
FIG. 17 is a perspective view showing the cam ring.

Referring to FIG. 17, a plurality of lens-frame-movement cam grooves 66 are provided in an outer peripheral surface of a cylindrical wall 4202 of the cam ring 42.

Also, a plurality of lens-frame-movement cam grooves 68 are provided in an inner peripheral surface of the cylindrical wall 4202 of the cam ring 42.

A linear-movement guide ring 56 is fitted to the cam ring 42 rotatably in the rotation direction but non-movably in the optical-axis direction.

The second group moving frame 36 is provided at the inner periphery of the cam ring 42. The second group moving frame 36 is supported by the linear-movement guide ring 56 non-rotatably but movably only in the optical-axis direction.

Cam pins 70 are provided at the outer periphery of the second group moving frame 36. The cam pins 70 engage with the lens-frame-movement cam grooves 68 of the cam ring 42.

The automatic exposure device 26 is attached to a front portion of the second group moving frame 36, with a distance regulating member 27 interposed therebetween, non-rotatably in the rotation direction but movably in the optical-axis direction by a predetermined distance.

The automatic exposure device 26 is an optical device having a shutter function of opening/closing an optical path through which light passes, a variable aperture function of increasing/decreasing a diameter of the optical path, and a filter function of inserting/removing a filter to/from the optical path.

The first group moving frame 32 is provided between the outer periphery of the cam ring 42 and the inner periphery of the linear-movement ring 40 non-rotatably in the rotation direction but movably only in the optical-axis direction.

Cam pins 72 are provided at the inner periphery of the first group moving frame 32. The cam pins 72 engage with the lens-frame-movement cam grooves 66 of the cam ring 42.

The linear-movement ring 40 is provided at the inner periphery of the fixed ring 44 non-rotatably in the rotation direction but movably only in the optical-axis direction. The linear-movement ring 40 moves in the optical-axis direction with the fixed ring 44 by a distance in which the cam ring 42 moves in the optical-axis direction.

A face ring 41 is mounted to the outer periphery of the linear-movement ring 40, and hence, the linear-movement ring 40 and the face ring 41 are integrally provided. The face ring 41 improves mainly the appearance of the lens barrel 14.

A lens barrier unit 58 is provided at a front end of the first group moving frame 32. The lens barrier unit 58 closes the optical path, serving as a shooting aperture, and protects the imaging optical system 16 when an image is not captured.

A face ring 33 is mounted to the first group moving frame 32. The face ring 33 improves the appearance of the lens barrel 14.

The automatic exposure device 26 is electrically connected to a flexible printed circuit 26A. An end of the flexible printed circuit 26A is connected to a wiring circuit of an actuator for driving a shutter mechanism and a variable aperture mechanism of the automatic exposure device 26. Another end of the flexible printed circuit 26A is electrically connected to a power source provided outside the lens barrel 14.

The operation of the lens barrel 14 is described.

When the drive gear 52 rotates the cam ring 42, the cam ring 42 moves inside the fixed ring 44 in the optical-axis direction via the cam followers 64 and the cam-ring-movement cam grooves 60.

Also, with the rotation of the cam ring 42, the cam pins 72 of the first group moving frame 32 move along the lens-frame-movement cam grooves 66 formed in the outer periphery of the cam ring 42, and hence the first group moving frame 32 moves in the optical-axis direction.

Further, with the rotation of the cam ring 42, the cam pins 70 of the second group moving frame 36 move along the lens-frame-movement cam grooves 68 formed in the inner periphery of the cam ring 42, and hence the second group moving frame 36 moves in the optical-axis direction.

In this way, the lens barrel 14 is retracted at the housed position as shown in FIG. 5 and protrudes at the protruding position as shown in FIG. 6. Hence a lens-barrel housing operation and an optical zooming operation are performed.

Herein, when the lens barrel 14 is at the housed position, the cam ring 42 is at the retracted position with respect to the fixed ring 44. When the lens barrel 14 is at the protruding position, the cam ring 42 is at the protruding position with respect to the fixed ring 44.

Next, a primary portion of this embodiment is described.

Figure 8:
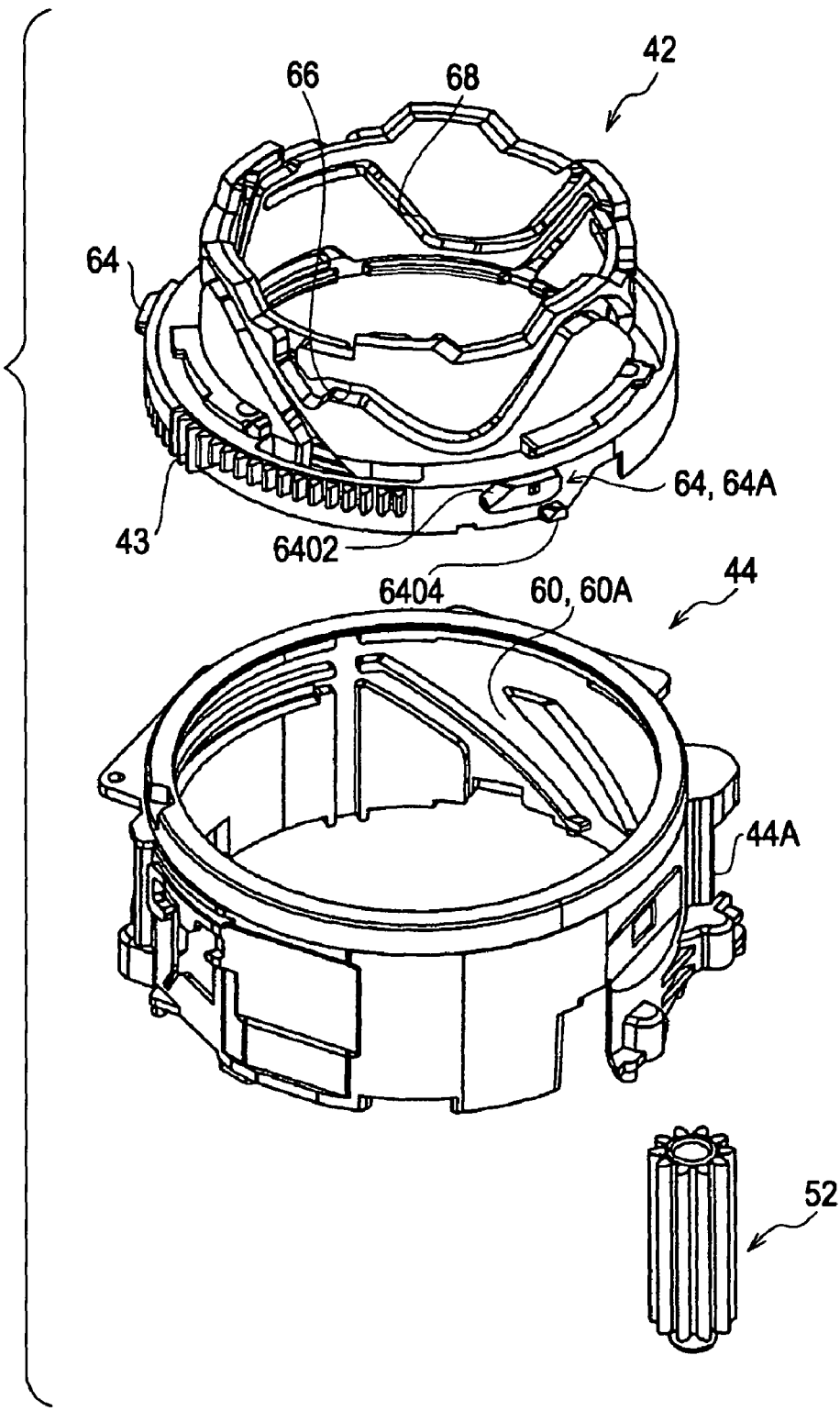
FIG. 8 is an exploded perspective view showing a cam ring, a fixed ring, and a drive gear when viewed from the front side.
Figure 9:
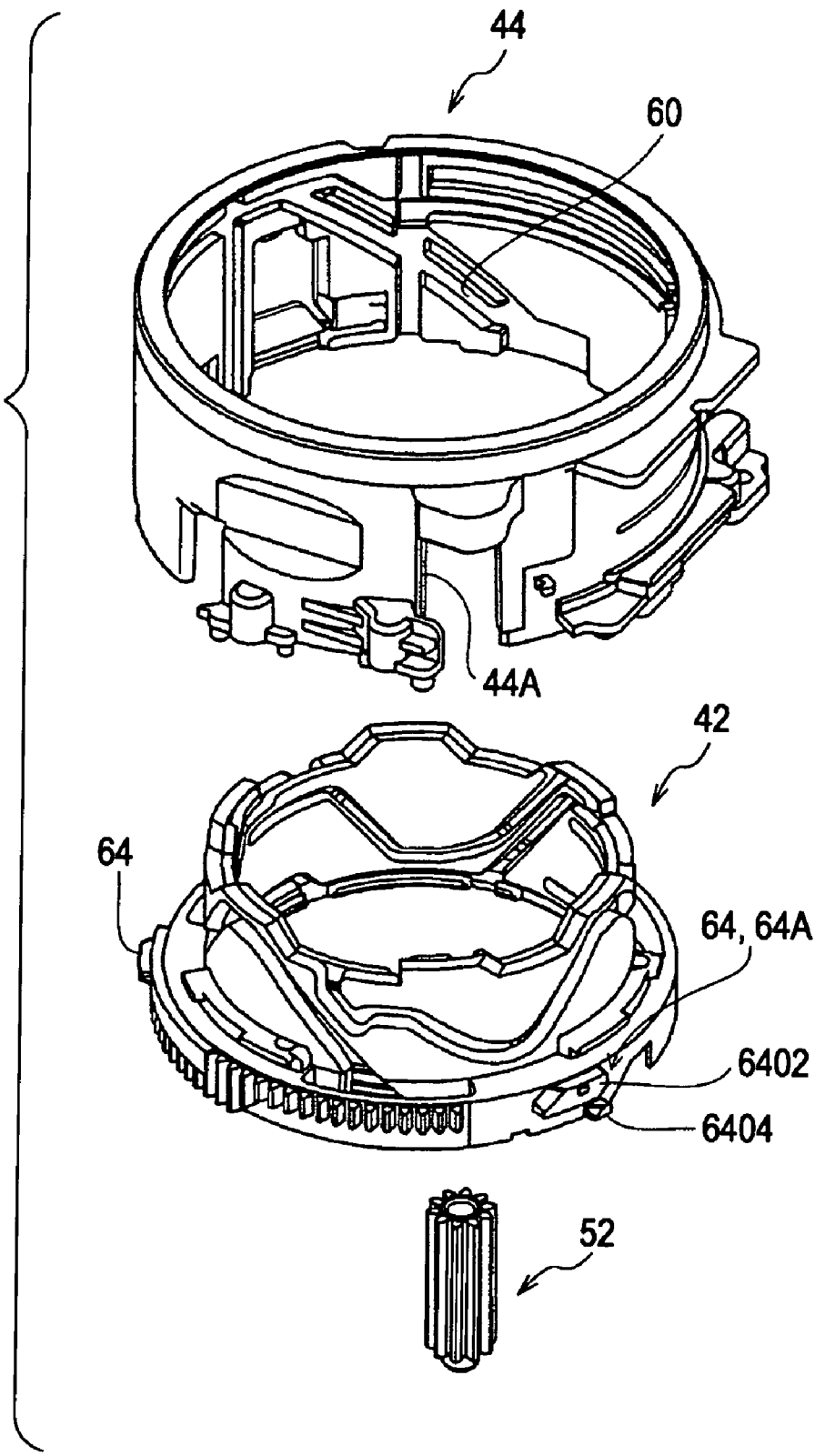
FIG. 9 is an exploded perspective view showing the cam ring, the fixed ring, and the drive gear when viewed from the front side at a position different from that of FIG. 8.
Figure 10:
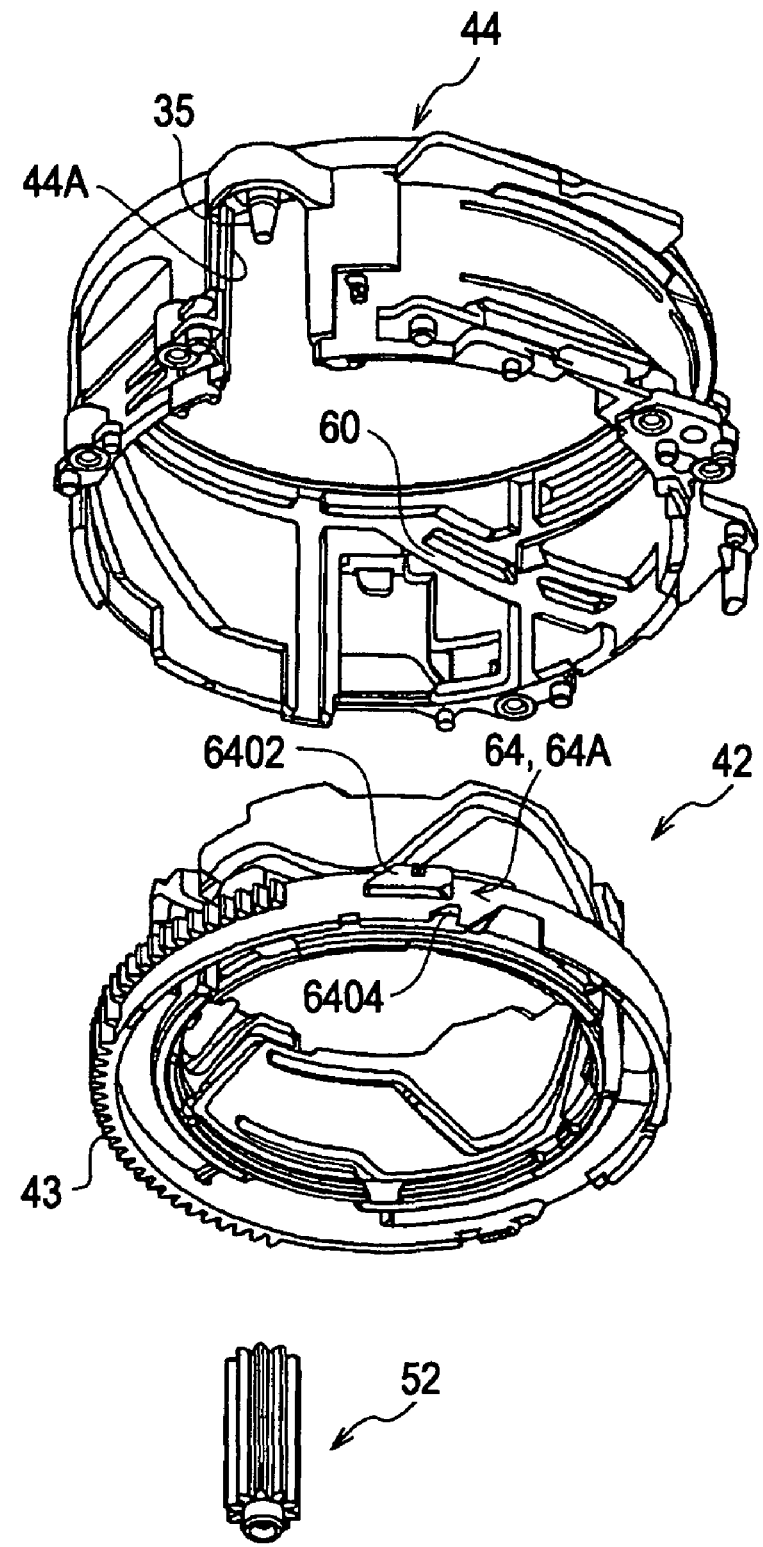
FIG. 10 is an exploded perspective view showing the cam ring, the fixed ring, and the drive gear when viewed from the rear side.

FIG. 8 is an exploded perspective view showing the cam ring 42, the fixed ring 44, and the drive gear 52 when viewed from the front side. FIG. 9 is an exploded perspective view showing the cam ring 42, the fixed ring 44, and the drive gear 52 when viewed from the front side at a position different from that of FIG. 8. FIG. 10 is an exploded perspective view showing the cam ring 42, the fixed ring 44, and the drive gear 52 when viewed from the rear side.

Figure 11A:
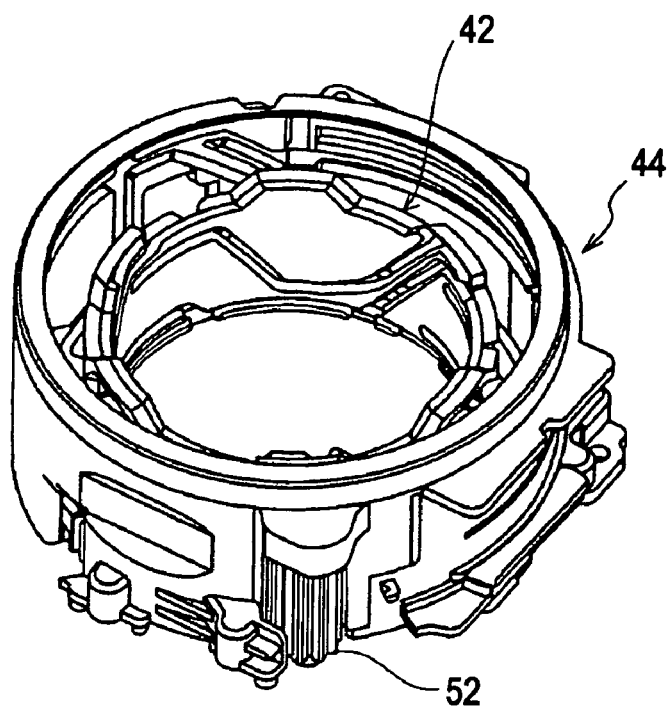
FIG. 11A is a perspective view showing a retracted position of the cam ring when viewed from the front side.
Figure 11B:
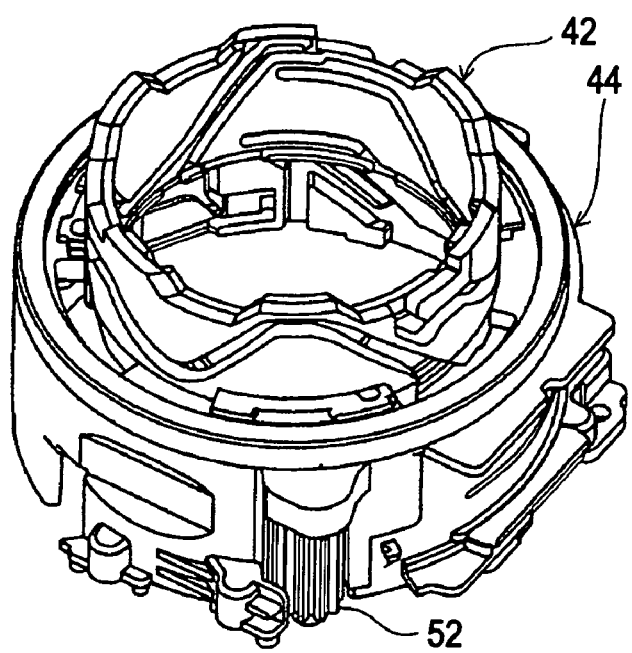
FIG. 11B is a perspective view showing a protruding position of the cam ring when viewed from the front side.

FIG. 11A is a perspective view showing the retracted position of the cam ring 42 when viewed from the front side, and FIG. 11B is a perspective view showing the protruding position of the cam ring 42 when viewed from the front side.

Figure 12A:
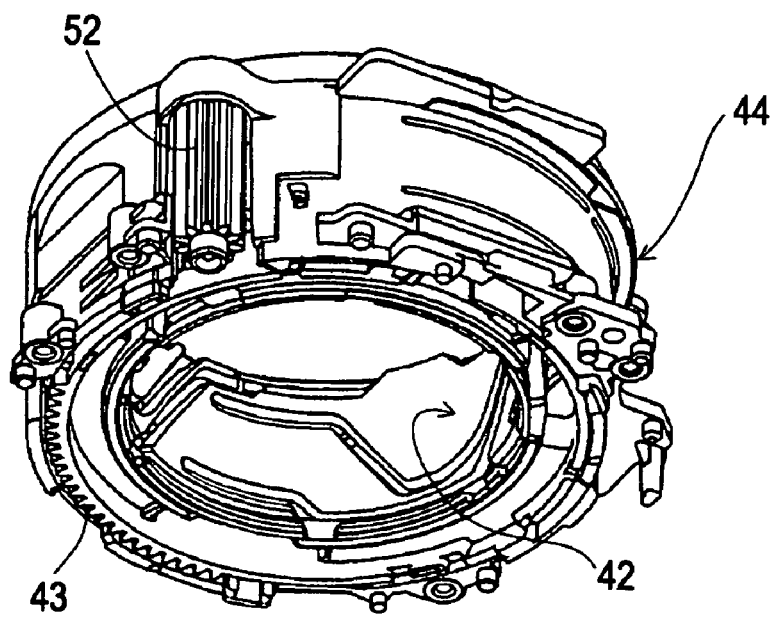
FIG. 12A is a perspective view showing the retracted position of the cam ring when viewed from the rear side.
Figure 12B:
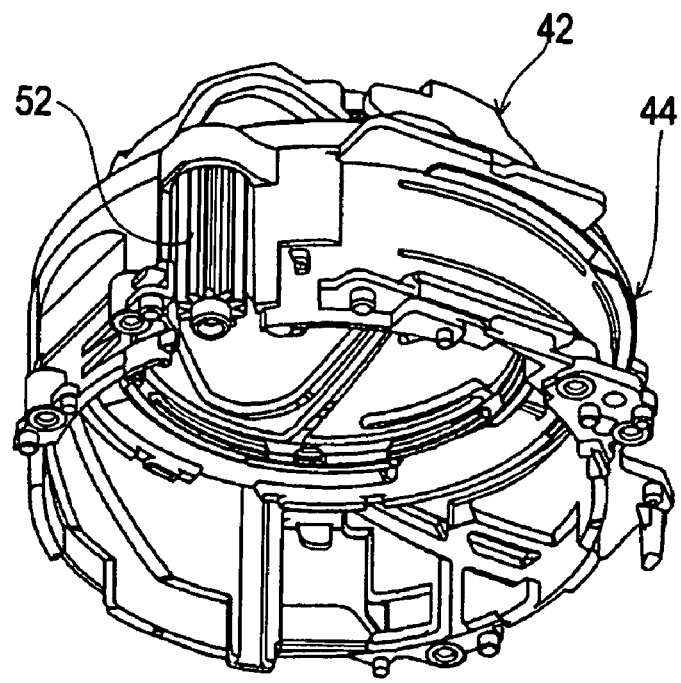
FIG. 12B is a perspective view showing the protruding position of the cam ring when viewed from the rear side.

FIG. 12A is a perspective view showing the retracted position of the cam ring 42 when viewed from the rear side, and FIG. 12B is a perspective view showing the protruding position of the cam ring 42 when viewed from the rear side.

Figure 13:
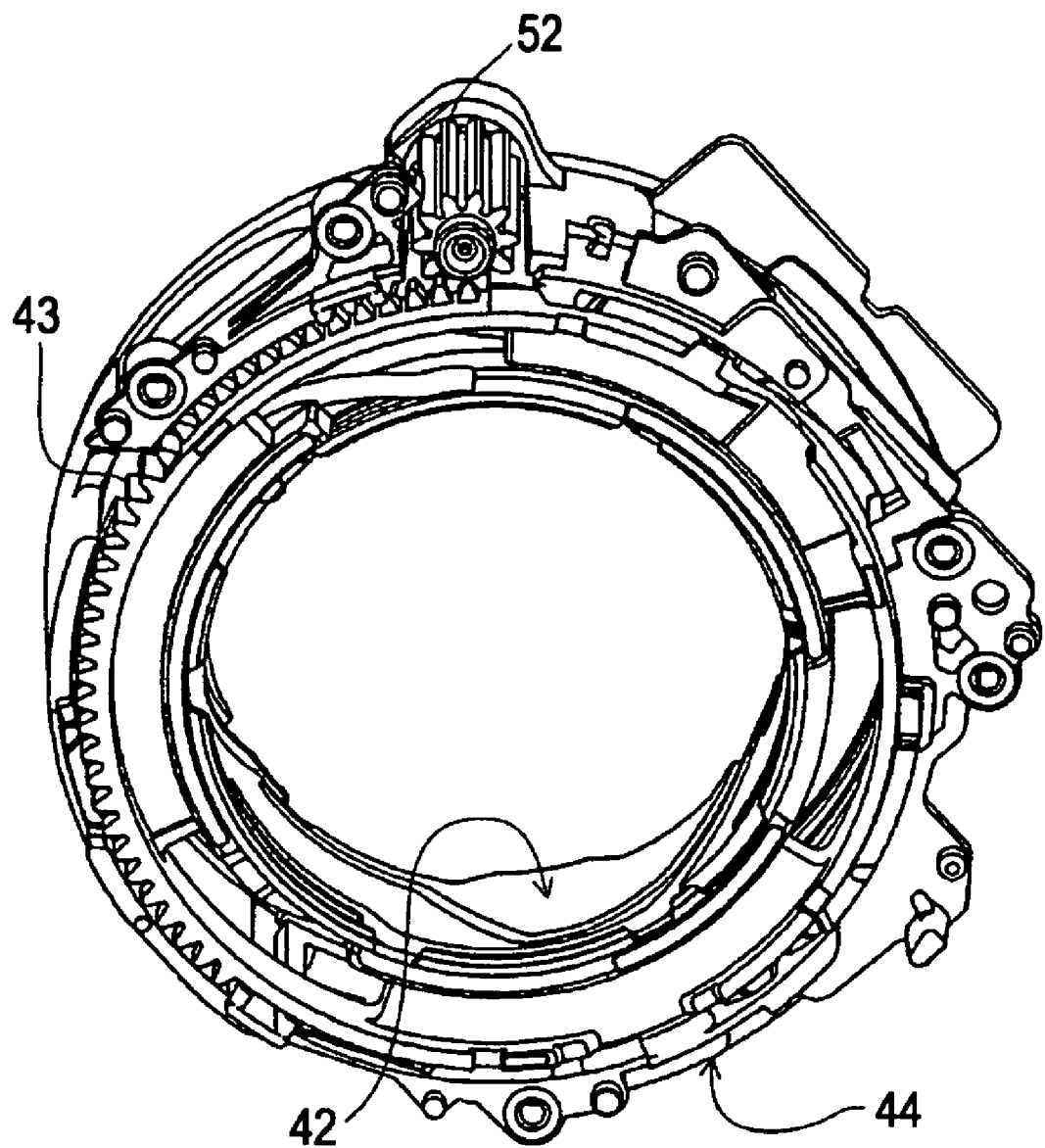
FIG. 13 is a perspective view showing the retracted position of the cam ring when viewed from the rear side at a position different from that of FIG. 12A.
Figure 14:
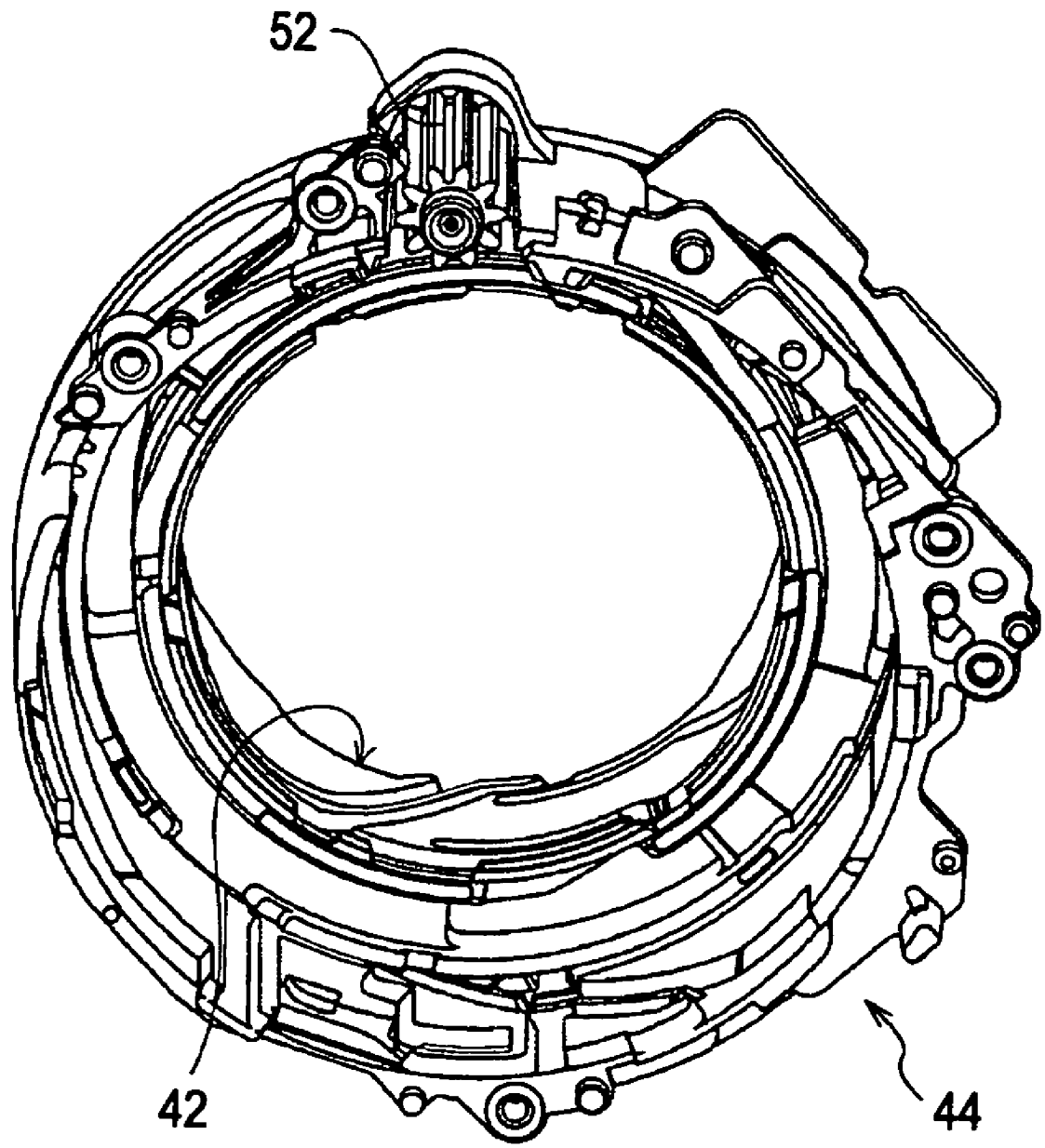
FIG. 14 is a perspective view showing the protruding position of the cam ring when viewed from the rear side at a position different from that of FIG. 12B.

FIG. 13 is a perspective view showing the retracted position of the cam ring 42 when viewed from the rear side at a position different from that of FIG. 12A. FIG. 14 is a perspective view showing the protruding position of the cam ring 42 when viewed from the rear side at a position different from that of FIG. 12B.

Figure 15:
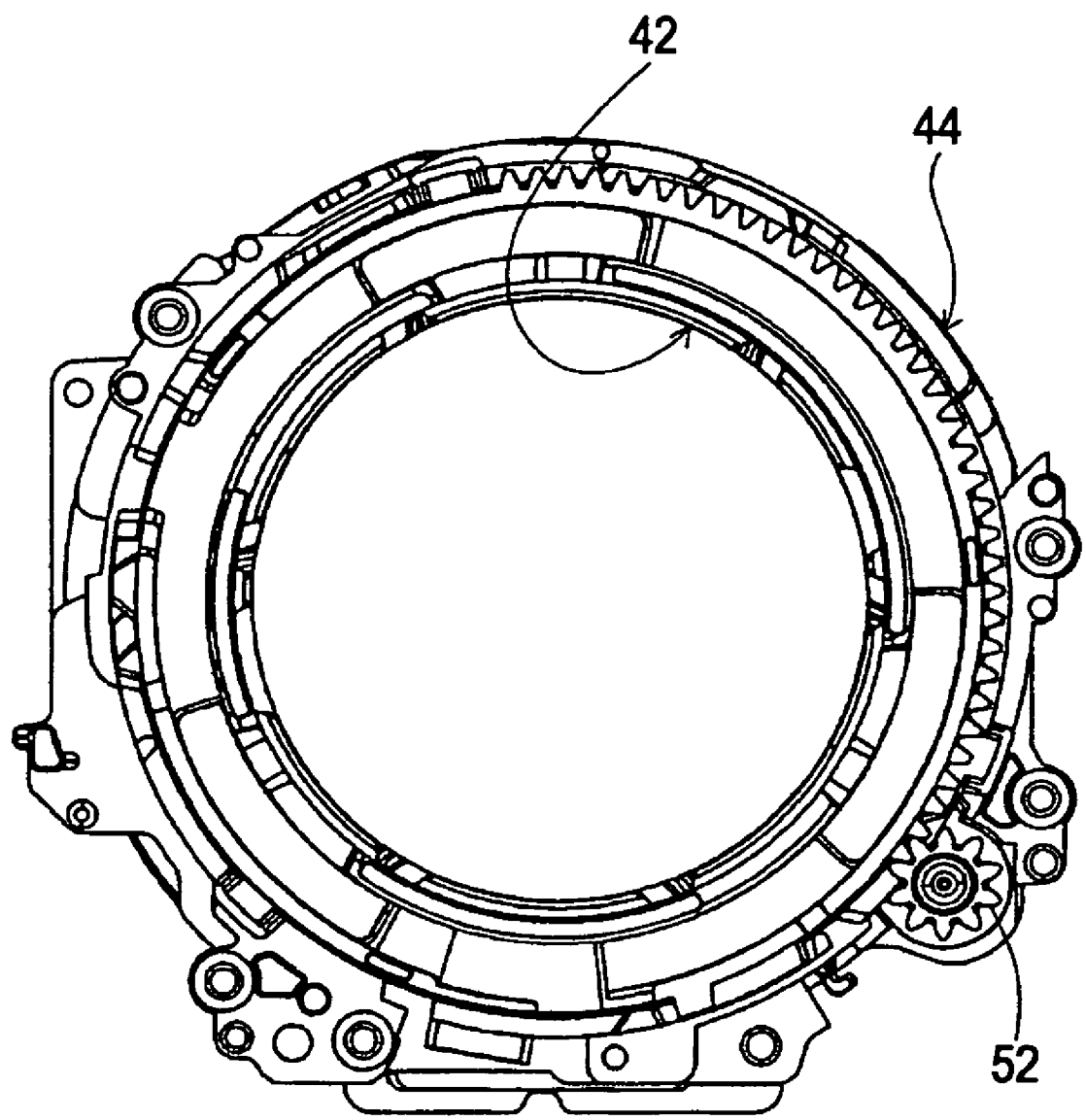
FIG. 15 is a rear view showing the fixed ring assembled with the cam ring when viewed from the rear side.

FIG. 15 is a rear view showing the fixed ring 44 assembled with the cam ring 42 when viewed from the rear side.

FIG. 16 is a cross-sectional view showing the lens barrel 14.

Figure 18:
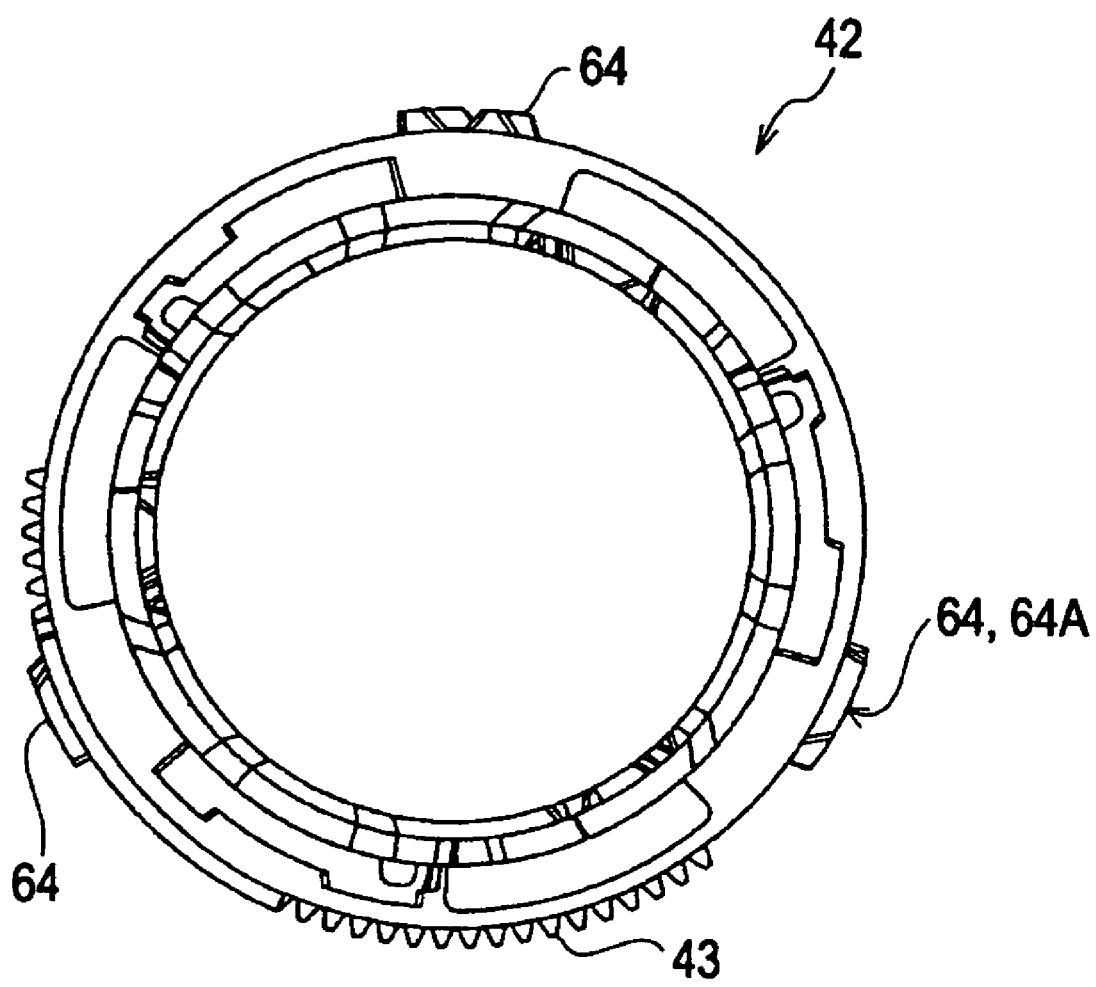
FIG. 18 is a plan view showing the cam ring.
Figure 19:
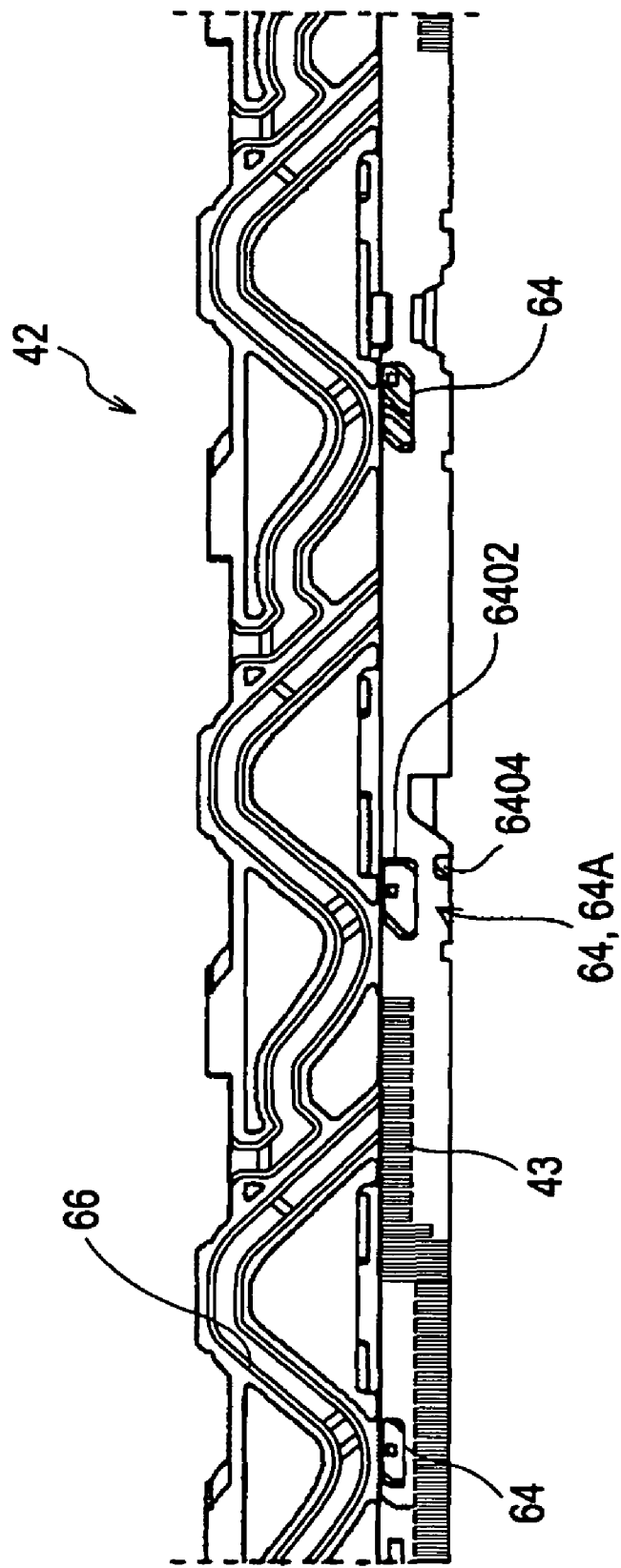
FIG. 19 is an expansion plan showing an outer peripheral surface of the cam ring.

FIG. 17 is a perspective view of the cam ring 42. FIG. 18 is a plan view of the cam ring 42. FIG. 19 is an expansion plan showing an outer peripheral surface of the cam ring 42.

Figure 20:
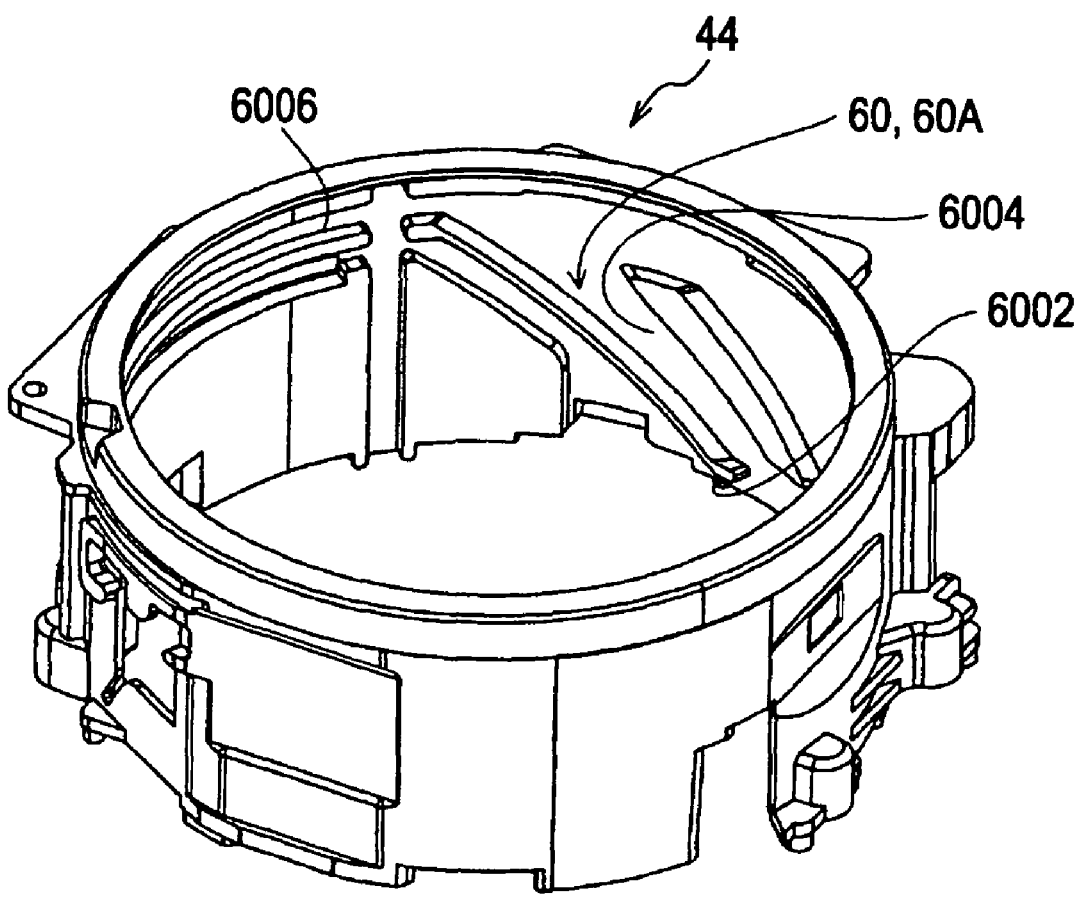
FIG. 20 is a perspective view showing the fixed ring.
Figure 21:
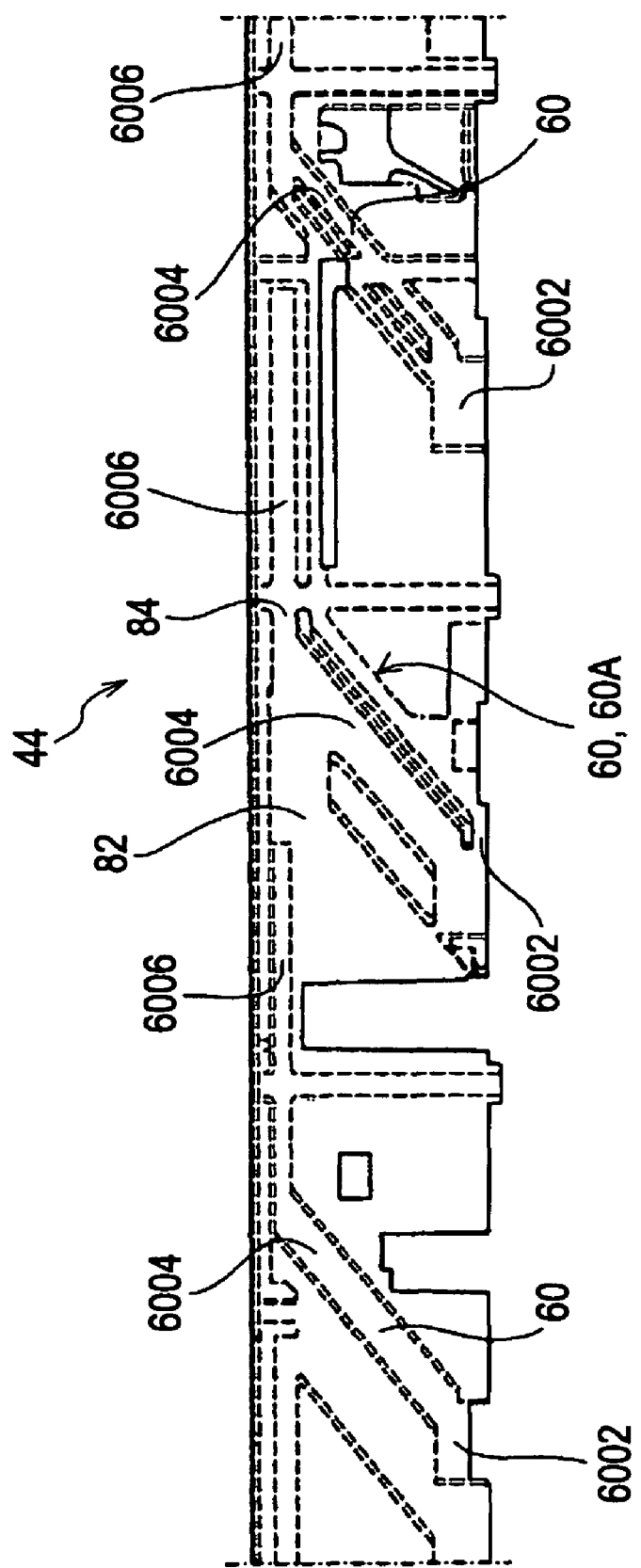
FIG. 21 is an expansion plan showing an inner peripheral surface of the fixed ring when transparently viewed from the outside in a radial direction of the fixed ring.

FIG. 20 is a perspective view showing the fixed ring 44. FIG. 21 is an expansion plan showing an inner peripheral surface of the fixed ring 44 when transparently viewed from the outside in a radial direction of the fixed ring 44.

Figure 22:
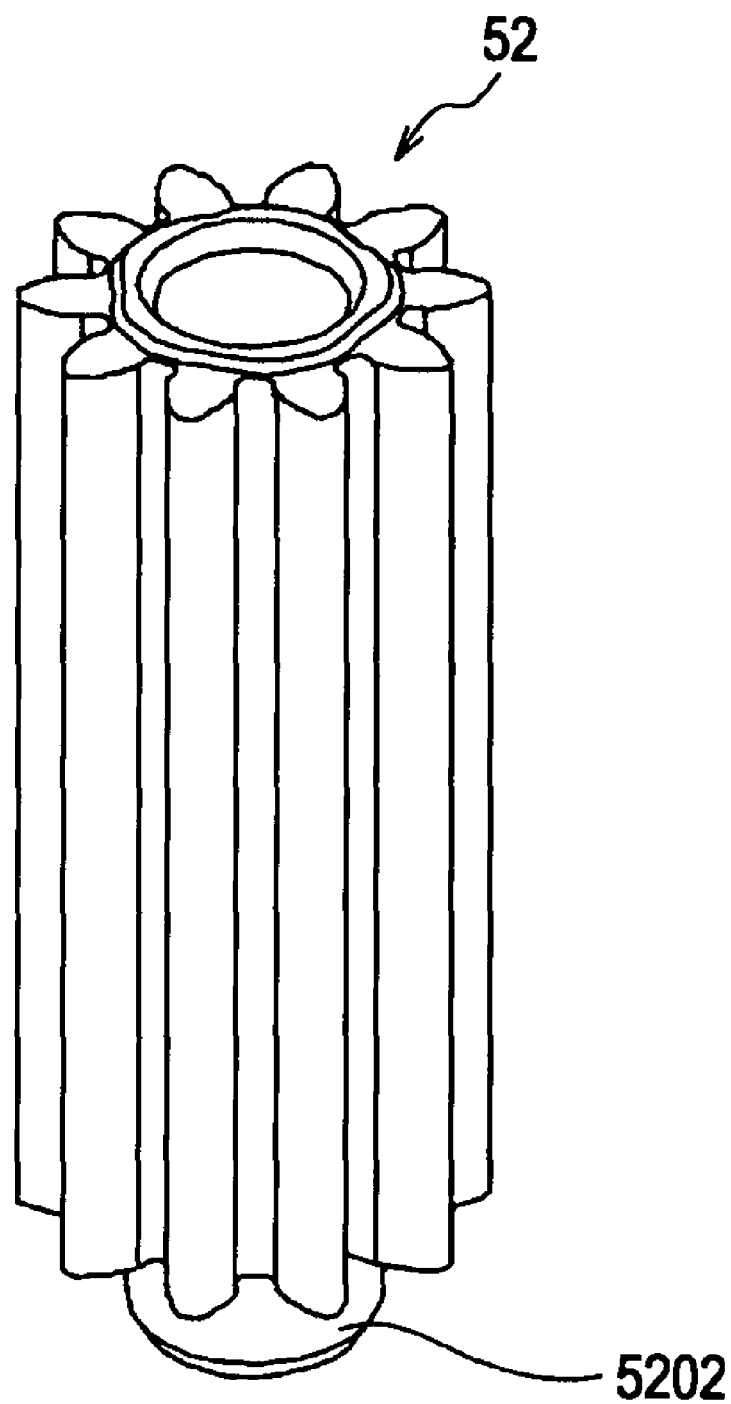
FIG. 22 is a perspective view showing the drive gear.

FIG. 22 is a perspective view showing the drive gear 52.

Referring to FIGS. 17 to 19, the gear portion 43 and the cam followers 64 are provided at a rear portion of an outer peripheral surface of the cylindrical wall 4202 of the cam ring 42.

The gear portion 43 protrudes outward in a radial direction of the outer peripheral surface of the cylindrical wall 4202 and extends in a circumferential direction.

The plurality of cam followers 64 are provided at the outer peripheral surface of the cylindrical wall 4202 at positions at intervals in the circumferential direction of the outer peripheral surface so as to protrude outward in the radial direction of the outer peripheral surface. Here, the number of cam followers 64 is three. The cam follower 64 located at a position at the most right side in FIG. 23A is not illustrated in the drawing.

When the gear portion 43 is rotated by the drive gear 52, the cam followers 64 are guided by the cam-ring-movement cam grooves 60, and the cam ring 42 moves in the axial direction of the fixed ring 44. The gear portion 43 is arranged at a position shifted from that of a first cam follower 64A (one of the plurality of cam followers 64) in the circumferential direction of the fixed ring 44 so as to be located at the rear side (immediately behind) in a moving direction of the first cam follower 64A in the circumferential direction.

Referring to FIG. 18, a tip end of the first cam follower 64A and an addendum of the gear portion 43 are located on cylindrical planes centering at a center axis of the cam ring 42 and having substantially equivalent diameters. Tip ends of the residual cam followers 64 are located on a cylindrical plane having a diameter larger than that of the cylindrical plane centering at the center axis of the cam ring 42 and passing through the addendum of the gear portion 43.

In this embodiment, the first cam follower 64A includes a front cam follower 6402 and a rear cam follower 6404 mutually displaced from each other in the axial direction of the cam ring 42.

The plurality of cam-ring-movement cam grooves 60 are provided so that the plurality of cam followers 64 respectively engage with the cam-ring-movement cam grooves 60. One of the plurality of cam-ring-movement cam grooves 60 which engages with the first cam follower 64A defines a first-cam-ring-movement cam groove 60A.

Referring to FIGS. 20 and 21, each cam-ring-movement cam groove 60 includes a retracted position cam groove portion 6002, a movement cam groove portion 6004, and a protruding position cam groove portion 6006.

The movement cam groove portion 6004 extends in the axial direction while being displaced in the circumferential direction of the cam ring 42.

The retracted position cam groove portion 6002 extends from one end in an extending direction of the movement cam groove portion 6004 to one side in the circumferential direction of the fixed ring 44.

The retracted position cam groove portion 6006 extends from another end in the extending direction of the movement cam groove portion 6004 to another side in the circumferential direction of the fixed ring 44.

The retracted position cam groove portion 6002 causes the cam ring 42 to be located at the retracted position retracted into the fixed ring 44 in a first rotation range of the cam ring 42 by rotation of the drive gear 52 meshing with the gear portion 43.

Referring to FIG. 23A, the retracted position cam groove portion 6002 has a side surface 6012 vertically provided on a bottom surface 6010 of the cam-ring-movement cam groove 60 and configured to engage with the front cam follower 6402. The cam ring 42 moves to the retracted position when the front cam follower 6402 engages with the side surface 6012.

Referring to FIG. 23A, the movement cam groove portion 6004 is connected to the retracted position cam groove portion 6002, and causes the cam ring 42 to move in the axial direction of the fixed ring 44 inside the fixed ring 44 in association with rotation of the cam ring 42 in a second rotation range of the cam ring 42 by the rotation of the drive gear 52 meshing with the gear portion 43.

The movement cam groove portion 6004 includes a protrusion side surface 6014 and a retraction side surface 6016. The protrusion side surface 6014 is vertically provided on the bottom surface 6010 of the cam-ring-movement cam groove 60 and engages with the cam follower 64 to cause the cam ring 42 to move from the retracted position to the protruding position. The retraction side surface 6016 is vertically provided on the bottom surface 6010 and engages with the cam follower 64 to cause the cam ring 42 to move from the protruding position to the retracted position.

Referring to FIG. 23A, the protruding position cam groove portion 6006 is connected to the movement cam groove portion 6004 and causes the cam ring 42 to move to the protruding position protruding from the fixed ring 44 in a third rotation range by rotation of the drive gear 52 meshing with the gear portion 43.

The protruding position cam groove portion 6006 has side surfaces 6018 and 6019 vertically provided on the bottom surface 6010 of the cam-ring-movement cam groove 60 and configured to engage with the front cam follower 6402. The cam ring 42 moves to the protruding position when the front cam follower 6402 engages with the side surfaces 6018 and 6019.

In this embodiment, a wall portion 80 protrudes from the bottom surface 6010 of the first-cam-ring-movement cam groove 60A. The wall portion 80 has a predetermined thickness and extends in the axial direction while being displaced in the circumferential direction of the cam ring 42. Both ends of the wall portion 80 extend in the circumferential direction of the cam ring 42. The side surface 6018 and the protrusion side surface 6014 are defined by one surface of the wall portion 80 in a thickness direction. The retraction side surface 6016 is defined by another surface of the wall portion 80 in the thickness direction.

In addition, in the first-cam-ring-movement cam groove 60A, the side surfaces 6018 and 6019 are formed at a wall portion 80A provided at a position separated from the wall portion 80. The side surface 6012 is formed at a wall portion 80B provided at a position separated from the wall portions 80 and 80B.

In FIG. 23A, reference numeral 8002 denotes a lacking portion of the wall portion 80.

Referring to FIGS. 23B to 25E, a gear housing recess 82 is provided in the inner peripheral surface of the fixed ring 44, for housing the gear portion 43.

A bottom surface of the first-cam-ring-movement cam groove 60A and a bottom surface of the gear housing recess 82 are located on cylindrical planes centering at a center axis of the fixed ring 44 and having substantially equivalent diameters.

In addition, a release portion 84 is provided at the inner peripheral surface of the fixed ring 44, to provide communication between the protruding position cam groove portion 6006 of the first-cam-ring-movement cam groove 60A and the gear housing recess 82.

The release portion 84 is provided at one end portion of the protrusion side surface 6014 located near the protruding position cam groove portion 6006 of the first-cam-ring-movement cam groove 60A.

The release portion 84 is provided to cause the gear portion 43 to move from the gear housing recess 82 through the release portion 84 to the protruding position cam groove portion 6006 of the first-cam-ring-movement cam groove 60A, at the protruding position.

Referring to FIG. 23A, the cut portion 44A is provided in the bottom surface of the gear housing recess 82. The drive gear 52 is housed in the cut portion 44A.

Herein, bottom surfaces of the cam-ring-movement cam grooves 60, with which the cam followers 64 located at the front and rear sides of the first cam follower 64A in the moving direction engage when the cam ring 42 moves from the retracted position to the protruding position, have a depth larger than that of a bottom surface of the gear housing recess 82.

(Assembly)

The cam ring 42, the fixed ring 44, and the drive gear 52 are assembled as follows.

Referring to FIGS. 10 and 23B, the cam ring 42 is inserted into the inner periphery of the fixed ring 44 from the rear side of the fixed ring 44. The plurality of cam followers 64 of the cam ring 42 respectively engage with the plurality of cam-ring-movement cam grooves 60. The one end of the drive gear 52 (FIG. 22) is coupled to the support shaft 35 through the cut portion 44A of the fixed ring 44. Then, the drive gear 52 meshes with the gear portion 43.

Next, referring to FIGS. 7 and 16, the rear barrel 48 is attached to a rear portion of the fixed ring 44, and the shaft portion 5202 of the drive gear 52 is coupled to the bearing portion 4810 of the rear barrel 48.

Accordingly, the cam ring 42 and the drive gear 52 are assembled with the fixed ring 44. By rotating the cam ring 42 via the drive gear 52 and the gear portion 43, the cam ring 42 moves in the optical-axis direction while being rotated via the plurality of cam-ring-movement cam grooves 60 and the plurality of cam followers 64.

(Operation)

Next, the operations of the cam ring 42 and the fixed ring 44 are described.

Figure 25E:
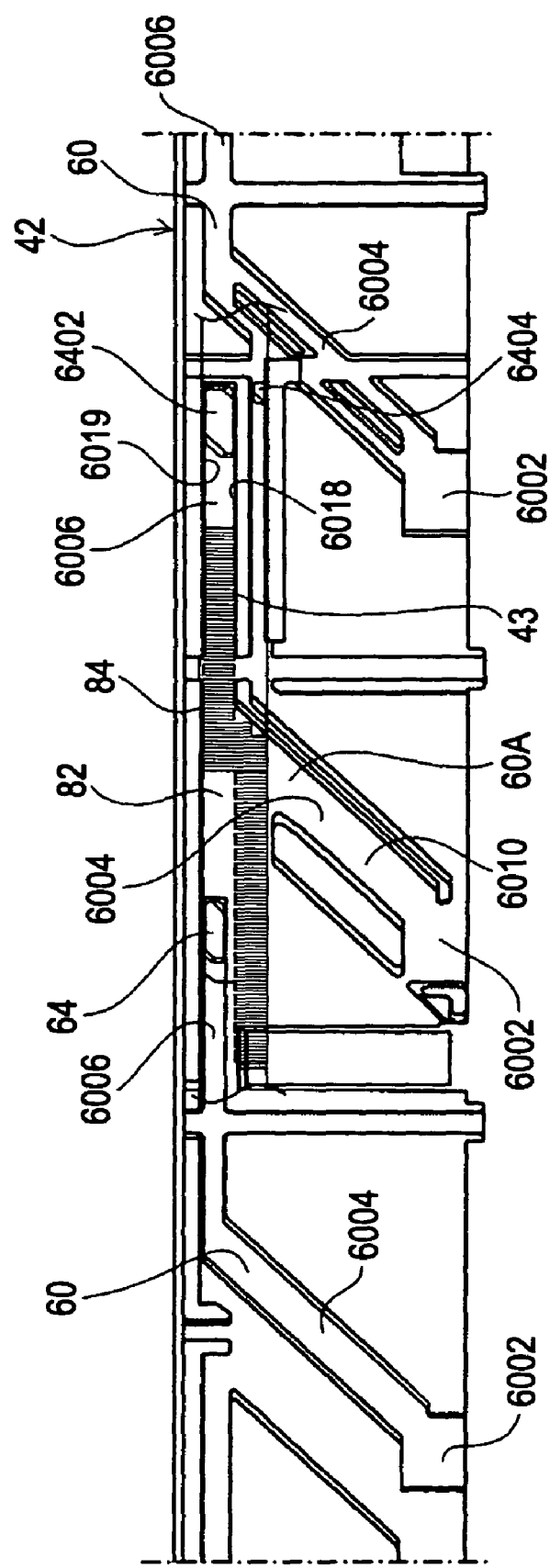
FIG. 25E is an explanatory diagram showing the operations of the cam ring and the fixed ring.

FIG. 23A is an explanatory diagram showing the gear portion 43 and the cam follower 64 of the cam ring 42, and the cam-ring-movement cam groove 60 of the fixed ring 44, and FIG. 23B is an explanatory diagram showing operations of the cam ring 42 and the fixed ring 44. FIGS. 24C, 24D, and 25E are explanatory diagrams each showing the operations of the cam ring 42 and the fixed ring 44.

First, a case is described in which the cam ring 42 moves from the retracted position to the protruding position.

It is assumed that the cam ring 42 is located at the retracted position shown in FIGS. 11A, 12A, 13, and 23B, and the cam follower 64 (in the case of the first cam follower 64, the front cam follower 6402) engages with the side surface 6012 inside the retracted position cam groove portion 6002.

Also, when the cam ring 42 moves from the retracted position to the protruding position, the gear portion 43 is located at the rear side in the moving direction of the first cam follower 64A in the circumferential direction of the fixed ring 44 and is housed in the gear housing recess 82.

Herein, when the cam ring 42 is normally rotated via the drive gear 52 and the gear portion 43, the cam follower 64 moves from the retracted position cam groove portion 6002 to the movement cam groove portion 6004, and the cam follower 64 engaging with the protrusion side surface 6014 moves along the movement cam groove portion 6004.

At this time, the first cam follower 64A moves from the retracted position cam groove portion 6002 to the movement cam groove portion 6004 of the first-cam-ring-movement cam groove 60A. The front cam follower 6402 engages with the protrusion side surface 6014, and moves along the movement cam groove portion 6004.

Accordingly, the cam ring 42 moves to the front side while being rotated as shown in FIG. 24C.

Following the cam ring 42, the gear portion 43 moves toward the front side while moving in the circumferential direction inside the gear housing recess 82.

When the cam ring 42 is further normally rotated, referring to FIG. 24D, the cam follower 64 reaches the protruding position cam groove portion 6006 from the movement cam groove portion 6004, and the cam follower 64 engages with the side surface 6019. Accordingly, the cam ring 42 is located at the protruding position.

At this time, in the case of the first cam follower 64A, the front cam follower 6402 passes through the release portion 84 and reaches the protruding position cam groove portion 6006 from the movement cam groove portion 6004 of the first-cam-ring-movement cam groove 60A. The front cam follower 6402 engages with the side surface 6019. Accordingly, the cam ring 42 is located at the protruding position.

Also, the gear portion 43 is located at a front portion of the gear housing recess 82.

When the cam ring 42 is further normally rotated, referring to FIG. 25E, the cam follower 64 moves toward the tip end of the protruding position cam groove portion 6006 while engaging with the side surfaces 6018 and 6019. Then, the cam follower 64 reaches the tip end of the protruding position cam groove portion 6006.

At this time, the first cam follower 64A moves toward the tip end of the protruding position cam groove portion 6006 of the first-cam-ring-movement cam groove 60A while engaging with the side surfaces 6018 and 6019 in a manner similar to other cam followers 64. Then, the first cam follower 64A reaches the tip end of the protruding position cam groove portion 6006.

Meanwhile, the cam ring 42 is continuously located at the protruding position.

Also, a portion of the gear portion 43 located near the first cam follower 64A passes through the release portion 84 and is housed in the protruding position cam groove portion 6006. The cam ring 42 at the protruding position is illustrated in FIGS. 11B, 12B, and 14.

Next, a case is described in which the cam ring 42 moves from the protruding position to the retracted position.

As described above, the cam ring 42 is located at the protruding position as shown in FIGS. 11B, 12B, 14, and 25E, and the cam follower 64 (in the case of the first cam follower 64, the front cam follower 6402) engages with the side surfaces 6018 and 6019 at the tip end of the protruding position cam groove portion 6006.

Herein, when the cam ring 42 is reversely rotated via the drive gear 52 and the gear portion 43, referring to FIG. 24D, the cam follower 64 moves along the protruding position cam groove portion 6006 toward the movement cam groove portion 6004 while engaging with the side surfaces 6018 and 6019, and then reaches the movement cam groove portion 6004.

At this time, the first cam follower 64A moves along the protruding position cam groove portion 6006 toward the movement cam groove portion 6004 of the first-cam-ring-movement cam groove 60A while engaging with the side surfaces 6018 and 6019 in a manner similar to other cam followers 64. Then, the first cam follower 64A passes through the release portion 84 and reaches the movement cam groove portion 6004.

Also, the gear portion 43 moves in the circumferential direction while being located at the front portion of the gear housing recess 82. The portion of the gear portion 43 located near the first cam follower 64A passes through the release portion 84, and is retracted from the protruding position cam groove portion 6006. Then, the whole gear portion 43 moves to the gear housing recess 82.

Meanwhile, the cam ring 42 is continuously located at the protruding position.

When the cam ring 42 is further reversely rotated, the cam follower 64 moves from the movement cam groove portion 6004 to the retracted position cam groove portion 6002. The cam follower 64 engaging with the retraction side surface 6016 moves along the movement cam groove portion 6004.

At this time, the first cam follower 64A moves from the protruding position cam groove portion 6006 to the movement cam groove portion 6004. The rear cam follower 6404 engages with the retraction side surface 6016 and moves along the movement cam groove portion 6004.

Accordingly, the cam ring 42 moves to the rear side while being rotated as shown in FIG. 24C.

Following the cam ring 42, the gear portion 43 moves toward the rear side while moving in the circumferential direction inside the gear housing recess 82.

When the cam ring 42 is further reversely rotated, referring to FIG. 23B, the cam follower 64 moves from the movement cam groove portion 6004 to the retracted position cam groove portion 6002. The cam follower 64 engaging with the retraction side surface 6012 moves along the retracted position cam groove portion 6002, and then reaches the base end of the retracted position cam groove portion 6002.

At this time, in the case of the first cam follower 64A, the rear cam follower 6404 moves from the movement cam groove portion 6004 of the first-cam-ring-movement cam groove 60A to the retracted position cam groove portion 6002. The front cam follower 6402 engaging with the retraction side surface 6012 moves along the retracted position cam groove portion 6002. Then, the front cam follower 6402 reaches the base end of the retracted position cam groove portion 6002.

Accordingly, the cam ring 42 is located at the retracted position.

Also, the gear portion 43 is housed in a rear portion of the gear housing recess 82.

(Advantage)

As described above, with this embodiment, the addendum of the gear portion 43 and the tip end of the first cam follower 64A are located on the cylindrical planes centering at the center axis of the cam ring 42 and having the substantially equivalent diameters. The gear housing recess 82 for housing the gear portion 43 is provided in the inner peripheral surface of the fixed ring 44. The bottom surface of the first-cam-ring-movement cam groove 60A, with which the first cam follower 64A included in the plurality of cam-ring-movement cam grooves 60 engages, and the bottom surface of the gear housing recess 82 are located on the cylindrical planes centering at the center axis of the fixed ring 44 and having the substantially equivalent diameters. The release portion 84 is provided at the inner peripheral surface of the fixed ring 44, to provide communication between the protruding position cam groove portion 6006 of the first-cam-ring-movement cam groove 60A and the gear housing recess 82. The portion of the gear portion 43 located near the first cam follower 64A passes through the release portion 84 and then is located in the protruding position cam groove portion 6006 of the first-cam-ring-movement cam groove 60A, at the protruding position.

Accordingly, when the cam ring 42 is at the protruding position, since the gear portion 43 moves between the gear housing recess 82 of the fixed ring 44 and the protruding position cam groove portion 6006 of the first-cam-ring-movement cam groove 60A, the cam ring 42 can smoothly move while the gear portion 43 is prevented from interfering with the inner peripheral surface of the fixed ring 44.

Thus, the thickness of the peripheral wall portion of the fixed ring 44, the portion corresponding to the moving locus of the gear portion 43, can be reduced.

The drive gear 52 is arranged at the peripheral wall portion of the fixed ring 44, the portion corresponding to the moving locus of the gear portion 43. Also, the rear reduction gear unit 50 including, though not illustrated, the output gear meshing with the drive gear 52, the at least one reduction gear which transmits power to the output gear, and the zoom motor which rotationally drives the output gear by transmitting power via the reduction gear, is arranged at the peripheral wall portion.

Accordingly, as a result of the reduction in thickness of the peripheral wall portion, the rear reduction gear unit 50 can be arranged closer to the center axis of the fixed ring 44. This arrangement is markedly advantageous to reducing the size of the lens barrel 14 and the size of the image pickup apparatus 10.

Second Embodiment

Next, a second embodiment is described.

Figure 27C:
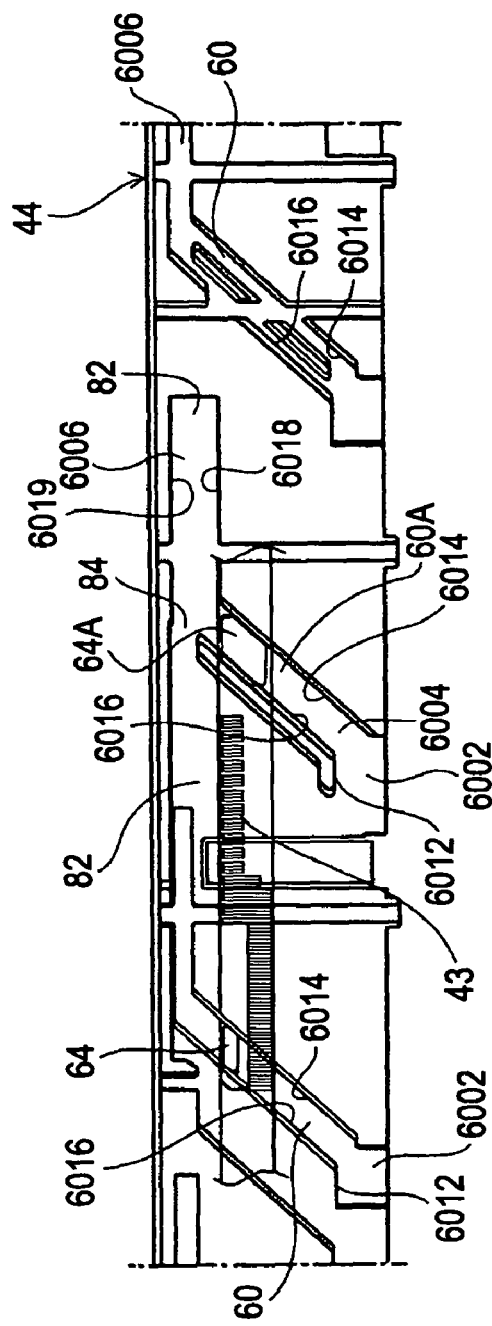
FIGS. 27C and 27D are explanatory diagrams each showing the operations of the cam ring and the fixed ring according to the second embodiment.
Figure 27D:
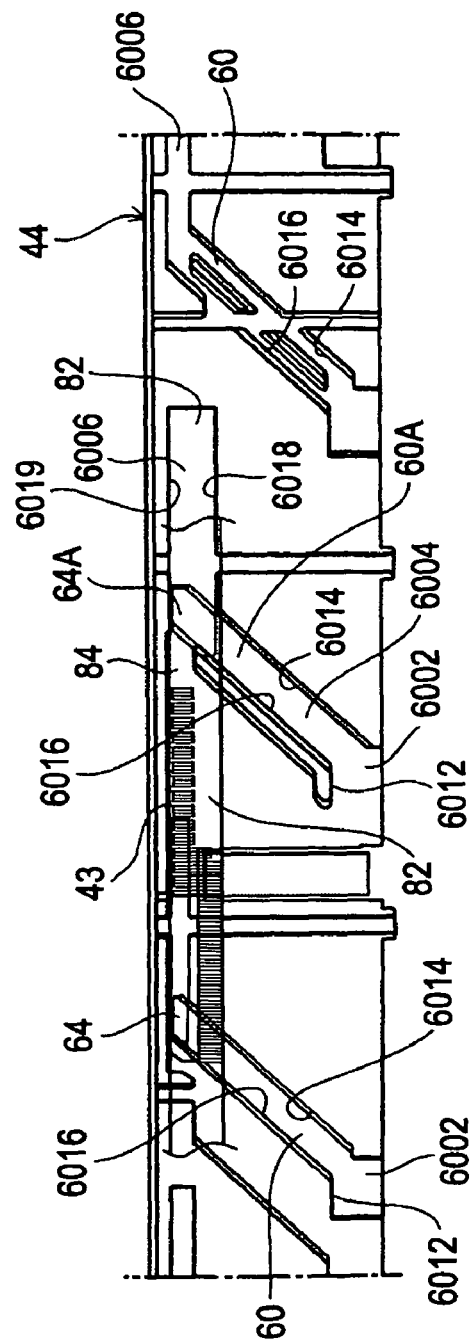
Figure 28E:
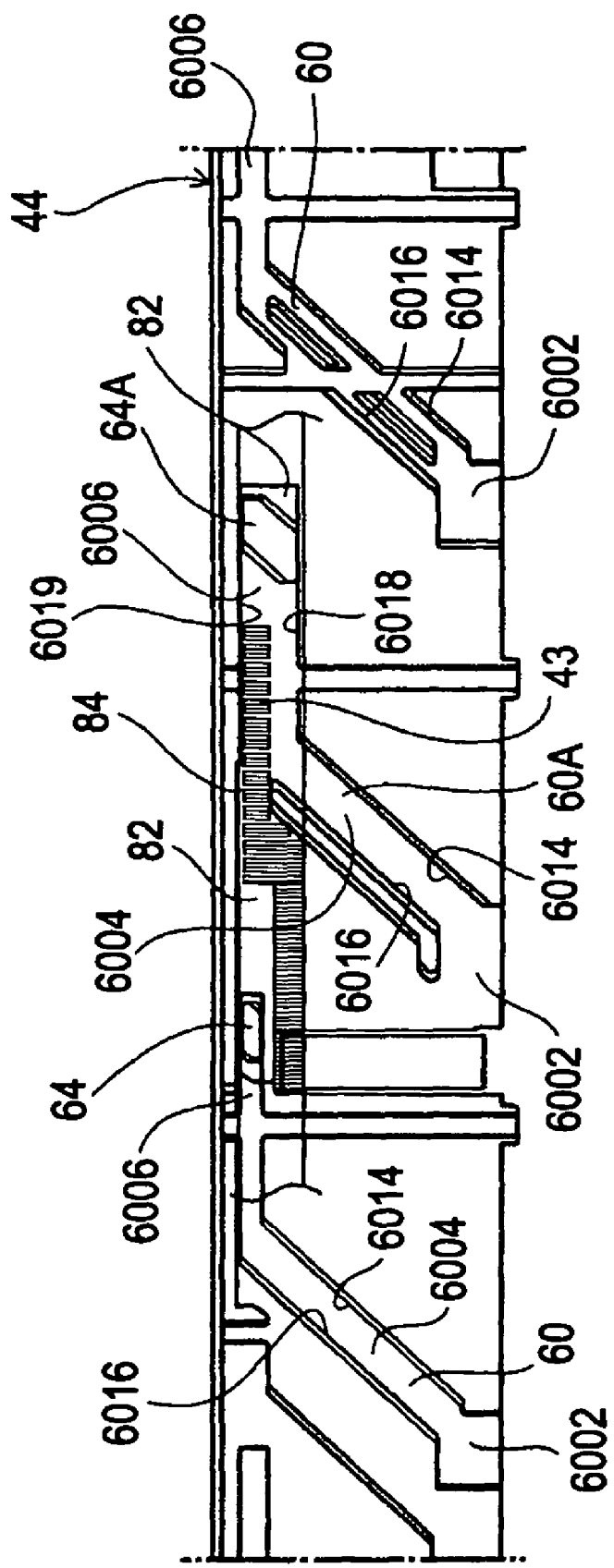
FIG. 28E is an explanatory diagram showing the operations of the cam ring and the fixed ring according to the second embodiment.

FIG. 26A is an explanatory diagram showing a gear portion 43 and a cam follower 64 of a cam ring 42, and a cam-ring-movement cam groove 60 of a fixed ring 44, and FIG. 26B is an explanatory diagram showing operations of the cam ring 42 and the fixed ring 44, according to the second embodiment. FIGS. 27C, 27D, and 28E are explanatory diagrams each showing operations of the cam ring 42 and the fixed ring 44 according to the second embodiment. In the following description of an embodiment, like numerals refer portions and members corresponding to those of the first embodiment.

In the first embodiment, the protrusion side surface 6014 and the retraction side surface 6016 of the movement cam groove portion 6004 of the first-cam-ring-movement cam groove 60A are defined by the one and another surfaces in the thickness direction of the wall portion 80 vertically provided on the bottom surface of the first-cam-ring-movement cam groove 60A. Referring to FIG. 26A, the second embodiment is different from the first embodiment in that a protrusion side surface 6014 faces a retraction side surface 6016, and that a first cam follower 64A is formed of a single cam follower.

In the second embodiment, a wall portion 80A similar to that of the first embodiment, and a wall portion 80C similar to the wall portion 80 of the first embodiment are provided on a bottom surface 6010 of the first-cam-ring-movement cam groove 60A. In addition, a wall portion 80D is provided to face the wall portion 80C.

Side surfaces 6018 and 6019 are formed at the wall portion 80A. The side surfaces 6018 and 6019 engage with the first cam follower 64A to define a protruding position of the cam ring 42.

A protrusion side surface 6014 is formed at the wall portion 80D. The protrusion side surface 6014 engages with the first cam follower 64A to guide the movement of the cam ring 42 from a retracted position to the protruding position.

Also, a retraction side surface 6016 is formed at the wall portion 80C. The retraction side surface 6016 engages with the first cam follower 64A to guide the movement of the cam ring 42 from the protruding position to the retracted position.

In the second embodiment, the protrusion side surface 6014 faces the retraction side surface 6016. In particular, in the second embodiment, the wall portions 80D and 80C protrude from the bottom surface 6010 of the first-cam-ring-movement cam groove 60A at predetermined intervals at positions displaced in the circumferential direction of the fixed ring 44 so as to extend in the axial direction while being displaced in the circumferential direction of the fixed ring 44. The protrusion side surface 6014 and the retraction side surface 6016 are provided at positions at which the wall portions 80D and 80C face each other such that the protrusion side surface 6014 faces the retraction side surface 6016.

Similarly to the first embodiment, a tip end of the first cam follower 64A and an addendum of the gear portion 43 are located on the cylindrical planes centering at a center axis of the cam ring 42 and having substantially equivalent diameters. Tip ends of the residual cam followers 64 are located on a cylindrical plane having a diameter larger than that of the cylindrical plane centering at the center axis of the cam ring 42 and passing through the addendum of the gear portion 43. Also, a bottom surface of the first-cam-ring-movement cam groove 60A and a bottom surface of the gear housing recess 82 are located on cylindrical planes centering at a center axis of the fixed ring 44 and having substantially equivalent diameters.

Now, the operation is described.

First, a case is described in which the cam ring 42 moves from the retracted position to the protruding position.

It is assumed that the cam ring 42 is located at the retracted position shown in FIG. 26B, and the cam follower 64 engages with the side surface 6012 inside the retracted position cam groove portion 6002.

Also, when the cam ring 42 moves from the retracted position to the protruding position, the gear portion 43 is located at the rear side in the moving direction of the first cam follower 64A in the circumferential direction of the fixed ring 44 and is housed in the gear housing recess 82.

Herein, when the cam ring 42 is normally rotated via the drive gear 52 and the gear portion 43, the cam follower 64 moves from the retracted position cam groove portion 6002 to the movement cam groove portion 6004, and the cam follower 64 engaging with the protrusion side surface 6014 moves along the movement cam groove portion 6004.

At this time, the first cam follower 64A moves from the retracted position cam groove portion 6002 to the movement cam groove portion 6004 of the first-cam-ring-movement cam groove 60A. The first cam follower 64A engages with the protrusion side surface 6014, and moves along the movement cam groove portion 6004.

Accordingly, the cam ring 42 moves to the front side while being rotated as shown in FIG. 27C.

Following the cam ring 42, the gear portion 43 moves toward the front side while moving in the circumferential direction inside the gear housing recess 82.

When the cam ring 42 is further normally rotated, referring to FIG. 27D, the cam follower 64 reaches the protruding position cam groove portion 6006 from the movement cam groove portion 6004, and the cam follower 64 engages with the side surface 6019. Accordingly, the cam ring 42 is located at the protruding position.

At this time, the first cam follower 64A passes through the release portion 84 and reaches the protruding position cam groove portion 6006 from the movement cam groove portion 6004 of the first-cam-ring-movement cam groove 60A. The first cam follower 64A engages with the side surface 6019. Accordingly, the cam ring 42 is located at the protruding position.

Also, the gear portion 43 is located at a front portion of the gear housing recess 82.

It is to be noted that, in the first embodiment, referring to FIGS. 23B, 24C, and 24D, the retraction side surface 6016 is displaced to the front side relative to the protrusion side surface 6014 in a rotation direction of the cam ring 42 when the cam ring 42 moves from the retracted position toward the protruding position while the cam ring 42 is rotated via the gear portion 43. In contrast, in the second embodiment, referring to FIGS. 26B, 27C, and 27D, the retraction side surface 6016 is displaced to the rear side relative to the protrusion side surface 6014 in a rotation direction of the cam ring 42 when the cam ring 42 moves from the retracted position toward the protruding position while the cam ring 42 is rotated via the gear portion 43.

When the cam ring 42 is further normally rotated, referring to FIG. 28E, the cam follower 64 moves toward a tip end of the protruding position cam groove portion 6006 while engaging with the side surfaces 6018 and 6019. Then, the cam follower 64 reaches the tip end of the protruding position cam groove portion 6006.

At this time, the first cam follower 64A moves toward the tip end of the protruding position cam groove portion 6006 of the first-cam-ring-movement cam groove 60A while engaging with the side surfaces 6018 and 6019 in a manner similar to other cam followers 64. Then, the first cam follower 64A reaches the tip end of the protruding position cam groove portion 6006.

Meanwhile, the cam ring 42 is continuously located at the protruding position.

Also, a portion of the gear portion 43 located near the first cam follower 64A passes through the release portion 84 and is housed in the protruding position cam groove portion 6006.

Next, a case is described in which the cam ring 42 moves from the protruding position to the retracted position.

As described above, the cam ring 42 is located at the protruding position shown in FIG. 28E, and the cam follower 64 engages with the side surfaces 6018 and 6019 at the tip end of the protruding position cam groove portion 6006.

Herein, when the cam ring 42 is reversely rotated via the drive gear 52 and the gear portion 43, referring to FIG. 27D, the cam follower 64 moves along the protruding position cam groove portion 6006 toward the movement cam groove portion 6004 while engaging with the side surfaces 6018 and 6019, and then reaches the movement cam groove portion 6004.

At this time, the first cam follower 64A moves along the protruding position cam groove portion 6006 toward the movement cam groove portion 6004 of the first-cam-ring-movement cam groove 60A while engaging with the side surfaces 6018 and 6019 in a manner similar to other cam followers 64. Then, the first cam follower 64A reaches the movement cam groove portion 6004.

Also, the gear portion 43 moves in the circumferential direction while being located at the front portion of the gear housing recess 82. The portion of the gear portion 43 located near the first cam follower 64A passes through the release portion 84, and is retracted from the protruding position cam groove portion 6006. Then, the whole gear portion 43 moves to the gear housing recess 82.

Meanwhile, the cam ring 42 is continuously located at the protruding position.

When the cam ring 42 is further reversely rotated, the cam follower 64 moves from the movement cam groove portion 6004 to the retracted position cam groove portion 6002. The cam follower 64 engaging with the retraction side surface 6016 moves along the movement cam groove portion 6004.

At this time, the first cam follower 64A moves from the protruding position cam groove portion 6006 to the movement cam groove portion 6004, engages with the retraction side surface 6016, and moves along the movement cam groove portion 6004.

Accordingly, the cam ring 42 moves to the rear side while being rotated as shown in FIG. 27C.

Following the cam ring 42, the gear portion 43 moves toward the rear side while moving in the circumferential direction inside the gear housing recess 82.

When the cam ring 42 is further reversely rotated, referring to FIG. 26B, the cam follower 64 moves from the movement cam groove portion 6004 to the retracted position cam groove portion 6002. The cam follower 64 engaging with the retraction side surface 6012 moves along the retracted position cam groove portion 6002, and then reaches the base end of the retracted position cam groove portion 6002.

At this time, the first cam follower 64A moves from the movement cam groove portion 6004 to the retracted position cam groove portion 6002 of the first-cam-ring-movement cam groove 60A. The first cam follower 64A engaging with the retraction side surface 6012 moves along the retracted position cam groove portion 6002. Then, the first cam follower 64A reaches the base end of the retracted position cam groove portion 6002.

Accordingly, the cam ring 42 is located at the retracted position.

Also, the gear portion 43 is housed in the gear housing recess 82.

With the second embodiment, an advantage similar to that of the first embodiment can be attained.

(Comparison)

Next, the first embodiment is compared with the second embodiment.

FIG. 29A is an explanatory diagram showing a condition in which the cam ring 42 is located at the protruding position according to the first embodiment, and FIG. 29B is an explanatory diagram showing a condition in which the cam ring 42 is located at a protruding position according to the second embodiment.

In the first and second embodiments, the gear portion 43 includes a front gear 43A and a rear gear 43B connected to the front gear 43A and located at the rear side of the front gear 43A, so as to prevent the gear portion 43 from interfering with the cam follower 64 located at the rear side in the moving direction of the first cam follower 64A when the cam ring 42 moves from the retracted position to the protruding position.

Referring to FIG. 29A, in the first embodiment, the rotating amount of the cam ring 42 in the circumferential direction while the cam ring 42 is held at the protruding position corresponds to a rotating amount of the cam ring 42 from a position at which the first cam follower 64A moves from the movement cam groove portion 6004 to the protruding position cam groove portion 6006, to a position at which a tip end of the rear gear 43B interferes with the wall portion 80.

Referring to FIG. 29B, in the second embodiment, the rotating amount of the cam ring 42 in the circumferential direction while the cam ring 42 is held at the protruding position corresponds to a rotating amount of the cam ring 42 from a position at which the first cam follower 64A moves from the movement cam groove portion 6004 to the protruding position cam groove portion 6006, to a position at which a tip end of the rear gear 43B interferes with the wall portion 80C.

In the second embodiment, the protrusion side surface 6014 and the retraction side surface 6016 face each other with a distance interposed therebetween to allow the first cam follower 64A to pass therethrough. Thus, the rotating amount of the cam ring 42 at the protruding position is determined on the basis of the position at which the gear portion 43 interferes with a rear surface of the wall portion 80C having the retraction side surface 6016 formed thereon.

In the first embodiment, the protrusion side surface 6014 and the retraction side surface 6016 are defined by the one and another surfaces of the wall portion 80 in the thickness direction. Thus, the rotating amount of the cam ring 42 is determined on the basis of a position at which the gear portion 43 interferes with the protrusion side surface 6014 of the wall portion 80.

Accordingly, in the first embodiment, as compared with the second embodiment, the wall portion to which the gear portion 43 contacts can be displaced to the front side in the moving direction of the gear portion 43 in the circumferential direction of the fixed ring 44 by a distance between the protrusion side surface 6014 and the retraction side surface 6016 of the second embodiment.

Hence, as compared with the second embodiment, the first embodiment is advantageous to sufficiently providing the rotating amount of the cam ring 42 at the protruding position.

In particular, as compared with the second embodiment, since the first embodiment is advantageous to sufficiently providing the rotating amount of the cam ring 42 at the protruding position, the first embodiment is also advantageous to sufficiently providing moving strokes of the first group moving frame 32 and the second group moving frame 36 in the optical-axis direction, and to increasing the degree of freedom for the design of the lens barrel 14 and the performance of the lens barrel 14.

It is to be noted that while the present invention has been applied to a digital still came as an example of the image pickup apparatus in the above-described embodiments, the present invention may be applied to an image pickup apparatus, such as a video camera or a TV camera.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel comprising:
a cam ring having a lens-frame-movement cam groove formed in an inner or outer peripheral surface, a plurality of cam followers provided at the outer peripheral surface at positions at intervals in a circumferential direction of the outer peripheral surface and protruding outward in a radial direction of the outer peripheral surface, and a gear portion extending in the circumferential direction while protruding outward in the radial direction of the outer peripheral surface; and
a fixed ring having a plurality of cam-ring-movement cam grooves in an inner peripheral surface, the cam followers respectively engaging with the cam-ring-movement cam grooves, the cam ring being inserted into the fixed ring,
wherein the cam-ring-movement cam grooves include a retracted position cam groove portion, a movement cam groove portion, and a protruding position cam groove portion, the retracted position cam groove portion causing the cam ring to be located at a retracted position retracted into the fixed ring in a first rotation range of the cam ring by rotation of a drive gear meshing with the gear portion, the movement cam groove portion being connected to the retracted position cam groove portion and causing the cam ring to move in an axial direction of the fixed ring inside the fixed ring in a second rotation range of the cam ring in association with rotation of the cam ring, the protruding position cam groove portion being connected to the movement cam groove portion and causing the cam ring to be located at a protruding position protruding from the fixed ring in a third rotation range of the cam ring,
wherein a gear housing recess is formed in the inner peripheral surface of the fixed ring, the gear housing recess housing the gear portion which moves to follow the movement of the cam ring,
wherein the gear portion is arranged at a position shifted from that of a first cam follower, which is one of the cam followers, in the circumferential direction of the fixed ring so as to be located at a rear side in a moving direction of the first cam follower when the cam follower moves from the retracted position cam groove portion to the protruding position cam groove portion, wherein the cam ring moves between the retracted position and the protruding position via the cam followers and the cam-ring-movement cam grooves while the cam ring is rotated inside the fixed ring by rotating the cam ring via the gear portion, wherein an addendum of the gear portion and a tip end of the first cam follower are located on cylindrical planes centering at a center axis of the cam ring and having substantially equivalent diameters, wherein a bottom surface of a first-cam-ring-movement cam groove, which is included in the cam-ring-movement cam grooves and with which the first cam follower engages, and a bottom surface of the gear housing recess are located on cylindrical planes centering at a center axis of the fixed ring and having substantially equivalent diameters, wherein a release portion is provided at the inner peripheral surface of the fixed ring, to provide communication between the protruding position cam groove portion of the first-cam-ring-movement cam groove and the gear housing recess, and wherein, when the cam ring is moved from the retracted position to the protruded position, the cam ring is operative to continue to rotate in a fixed radial plane in the fixed ring, such that the first cam follower moves through the release portion and, simultaneously therewith, the gear portion moves along the gear housing recess and, after the first cam follower passes through the release portion, the first cam follower moves into the protruding position cam groove portion and, simultaneously therewith, the portion of the gear portion located near the first cam follower enters into and passes through the release portion and extends at least partially into the protruding position cam groove portion with at least the first cam follower sized to be disposed in a close-fitting, sliding relationship with the protruding position cam groove portion.

2. The lens barrel according to claim 1, wherein the movement cam groove portion of the first-cam-ring-movement cam groove includes a protrusion side surface and a retraction side surface, the protrusion side surface projecting radially inwardly from the bottom surface of the first-cam-ring-movement cam groove, engaging with the first cam follower, and causing the cam ring to move from the retracted position to the protruding position, the retraction side surface projecting radially inwardly from the bottom surface of the first-cam-ring-movement cam groove, engaging with the first cam follower, and causing the cam ring to move from the protruding position to the retracted position, and wherein the release portion is provided at an end portion of the protrusion side surface located near the protruding position cam groove portion.

3. The lens barrel according to claim 2, wherein a wall portion is projecting radially inwardly from the bottom surface of the first-cam-ring-movement cam groove, the wall portion with a predetermined thickness extending in the axial direction while being displaced in the circumferential direction of the cam ring, and wherein the protrusion side surface is defined by one surface of the wall portion in a thickness direction, and the retraction side surface is defined by another surface of the wall portion in the thickness direction.

4. The lens barrel according to claim 2, wherein wall portions protrude from the bottom surface of the first-cam-ring-movement cam groove at predetermined intervals at positions displaced in the circumferential direction of the fixed ring so as to extend in the axial direction while being displaced in the circumferential direction of the fixed ring, wherein the protrusion side surface and the retraction side surface are provided at a position at which the wall portions face each other such that the protrusion side surface faces the retraction side surface, and wherein the retraction side surface is displaced to the front side relative to the protrusion side surface in a rotation direction of the cam ring when the cam ring moves from the retracted position toward the protruding position while the cam ring is rotated via the gear portion.

5. The lens barrel according to claim 1, wherein the movement cam groove portion extends in the axial direction while being displaced in the circumferential direction of the fixed ring, wherein the retracted position cam groove portion extends from an end of the movement cam groove portion in an extending direction to one side in the circumferential direction of the fixed ring, and wherein the protruding position cam groove portion extends from another end of the movement cam groove portion in the extending direction to another side in the circumferential direction of the fixed ring.

6. An image pickup apparatus comprising:

a lens barrel which includes a cam ring having a lens-frame-movement cam groove formed in an inner or outer peripheral surface, a plurality of cam followers provided at the outer peripheral surface at positions at intervals in a circumferential direction of the outer peripheral surface and protruding outward in a radial direction of the outer peripheral surface, and a gear portion extending in the circumferential direction while protruding outward in the radial direction of the outer peripheral surface; and a fixed ring having a plurality of cam-ring-movement cam grooves in an inner peripheral surface, the cam followers respectively engaging with the cam-ring-movement cam grooves, the cam ring being inserted into the fixed ring, wherein the cam-ring-movement cam grooves include a retracted position cam groove portion, a movement cam groove portion, and a protruding position cam groove portion, the retracted position cam groove portion causing the cam ring to be located at a retracted position retracted into the fixed ring in a first rotation range of the cam ring by rotation of a drive gear meshing with the gear portion, the movement cam groove portion being connected to the retracted position cam groove portion and causing the cam ring to move in an axial direction of the fixed ring inside the fixed ring in a second rotation range of the cam ring in association with rotation of the cam ring, the protruding position cam groove portion being connected to the movement cam groove portion and causing the cam ring to be located at a protruding position protruding from the fixed ring in a third rotation range of the cam ring, wherein a gear housing recess is formed in the inner peripheral surface of the fixed ring, the gear housing recess housing the gear portion which moves to follow the movement of the cam ring, wherein the gear portion is arranged at a position shifted from that of a first cam follower, which is one of the cam followers, in the circumferential direction of the fixed ring so as to be located at a rear side in a moving direction of the first cam follower when the cam follower moves from the retracted position cam groove portion to the protruding position cam groove portion, wherein the cam ring moves between the retracted position and the protruding position via the cam followers and the cam-ring-movement cam grooves while the cam ring is rotated inside the fixed ring by rotating the cam ring via the gear portion, wherein an addendum of the gear portion and a tip end of the first cam follower are located on cylindrical planes centering at a center axis of the cam ring and having substantially equivalent diameters, wherein a bottom surface of a first-cam-ring-movement cam groove, which is included in the cam-ring-movement cam grooves and with which the first cam follower engages, and a bottom surface of the gear housing recess are located on cylindrical planes centering at a center axis of the fixed ring and having substantially equivalent diameters, wherein a release portion is provided at the inner peripheral surface of the fixed ring, to provide communication between the protruding position cam groove portion of the first-cam-ring-movement cam groove and the gear housing recess, and wherein, when the cam ring is moved from the retracted position to the protruded position, the cam ring is operative to continue to rotate in a fixed radial plane in the fixed ring, such that the first cam follower moves through the release portion and, simultaneously therewith, the gear portion moves along the gear housing recess and, after the first cam follower passes through the release portion, the first cam follower moves into the protruding position cam groove portion and, simultaneously therewith, the portion of the gear portion located near the first cam follower enters into and passes through the release portion and extends at least partially into the protruding position cam groove portion with at least the first cam follower sized to be disposed in a close-fitting, sliding relationship with the protruding position cam groove portion.

\* \* \* \* \*